(12) United States Patent
Bishop

(10) Patent No.: US 11,192,630 B2
(45) Date of Patent: Dec. 7, 2021

(54) MOVEABLE WING TIP DEVICE, AN OUTER END OF A WING, AND INTERFACE THEREBETWEEN

(71) Applicant: Airbus Operations Limited, Bristol (GB)

(72) Inventor: Benjamin Bishop, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 346 days.

(21) Appl. No.: 16/356,232

(22) Filed: Mar. 18, 2019

(65) Prior Publication Data

US 2019/0283859 A1 Sep. 19, 2019

(30) Foreign Application Priority Data

Mar. 19, 2018 (GB) ...................................... 1804361

(51) Int. Cl.
  *B64C 3/56* (2006.01)
  *B64C 3/18* (2006.01)
  *B64C 3/26* (2006.01)
  *B64C 23/06* (2006.01)

(52) U.S. Cl.
  CPC ............... *B64C 3/56* (2013.01); *B64C 3/185* (2013.01); *B64C 3/26* (2013.01); *B64C 23/072* (2017.05)

(58) Field of Classification Search
  CPC .... B64C 3/38; B64C 3/40; B64C 3/56; B64C 23/072; B64C 23/065; B64C 5/08; B64C 5/10; B64C 3/185; B64C 3/26; Y02T 50/10
  See application file for complete search history.

(56) References Cited

U.S. PATENT DOCUMENTS

| 1,723,962 | A | * | 8/1929 | Weymouth | ................ | B64C 3/56 |
| | | | | | | 244/49 |
| 1,928,336 | A | * | 9/1933 | Kindelberger | ............ | B64C 3/56 |
| | | | | | | 244/49 |

(Continued)

FOREIGN PATENT DOCUMENTS

| GB | 627121 | 7/1949 |
| GB | 2524828 | 10/2015 |

(Continued)

OTHER PUBLICATIONS

Combined Search and Examination Report for GB1804361.2, dated Sep. 19, 2018, 8 pages.

*Primary Examiner* — Medhat Badawi
(74) *Attorney, Agent, or Firm* — Nixon & Vanderhye P.C.

(57) ABSTRACT

An aircraft having a wing, including a fixed wing with a wing tip device movably mounted at the outer end thereof is disclosed. The wing tip device is movable between: a flight configuration; and a ground configuration. The wing tip device and the fixed wing are separated along an oblique primary cut plane. The wing tip device and the fixed wing meet along an interfacing cut line. The wing tip device and fixed wing comprise a wing skin with a thickness, and end faces extending across the thickness of the wing skin provide interfacing surfaces corresponding to the interfacing cut line, wherein the interfacing surfaces are angled at a first orientation towards the front of the wing and a second, opposite, orientation towards the rear of the wing.

17 Claims, 18 Drawing Sheets

(56) References Cited

U.S. PATENT DOCUMENTS

| | | | | |
|---|---|---|---|---|
| 2,021,324 A * | 11/1935 | Osborn | B64C 3/56 | 244/49 |
| 2,166,564 A * | 7/1939 | Pavlecka | B64C 3/56 | 244/49 |
| 2,290,850 A * | 7/1942 | Umschweif | B64C 3/56 | 244/49 |
| 2,375,423 A * | 5/1945 | Odilon | B64C 3/54 | 244/218 |
| 2,418,301 A * | 4/1947 | Charles | B64C 3/42 | 244/91 |
| 2,674,422 A * | 4/1954 | Pellarini | B64C 3/56 | 244/49 |
| 2,712,421 A * | 7/1955 | Naumann | B64C 3/56 | 244/49 |
| 2,961,196 A * | 11/1960 | Atkinson | B64C 3/40 | 244/46 |
| 3,039,721 A * | 6/1962 | Rogers, Jr. | B64D 37/04 | 244/135 R |
| 3,081,053 A * | 3/1963 | Jarrell | B64C 3/56 | 244/49 |
| 3,439,890 A * | 4/1969 | Stits | B64C 3/56 | 244/49 |
| 3,599,904 A * | 8/1971 | Condit | B64C 3/38 | 244/38 |
| 3,647,163 A * | 3/1972 | Swwwney | B64C 3/56 | 244/49 |
| 3,743,218 A * | 7/1973 | Sweeney | B64C 3/42 | 244/36 |
| 4,022,403 A * | 5/1977 | Chiquet | B61B 15/00 | 244/46 |
| 4,132,375 A * | 1/1979 | Lamar | B64C 23/072 | 244/90 R |
| 4,336,914 A * | 6/1982 | Thomson | F42B 10/20 | 244/3.27 |
| 4,667,898 A * | 5/1987 | Greenhalgh | B64C 31/028 | 244/219 |
| 4,691,880 A * | 9/1987 | Frank | F42B 10/16 | 244/49 |
| 4,717,093 A * | 1/1988 | Rosenberger | F42B 10/16 | 244/49 |
| 4,778,129 A * | 10/1988 | Byford | B64C 3/56 | 244/49 |
| 4,779,820 A * | 10/1988 | Lambert | B64C 3/56 | 244/49 |
| 5,192,037 A * | 3/1993 | Moorefield | B64C 3/56 | 244/3.28 |
| 5,201,479 A * | 4/1993 | Renzelmann | B64C 3/56 | 244/49 |
| 5,310,138 A * | 5/1994 | Fitzgibbon | B64C 3/56 | 244/49 |
| 5,350,135 A * | 9/1994 | Renzelmann | B64C 3/56 | 244/49 |
| 5,372,336 A * | 12/1994 | Paez | B64C 3/56 | 244/49 |
| 5,427,329 A * | 6/1995 | Renzelmann | B64C 3/56 | 244/49 |
| 5,558,299 A * | 9/1996 | Veile | B64C 3/56 | 244/49 |
| 5,671,899 A * | 9/1997 | Nicholas | B64C 3/40 | 244/3.28 |
| 6,076,766 A * | 6/2000 | Gruensfelder | B64C 3/56 | 244/130 |
| 6,260,798 B1 * | 7/2001 | Casiez | B64C 39/024 | 244/49 |
| 6,260,799 B1 * | 7/2001 | Russ | B64C 3/56 | 244/49 |
| 6,361,279 B1 * | 3/2002 | Rodde | B64C 27/467 | 416/223 R |
| 6,446,906 B1 * | 9/2002 | Voigt | B64C 9/36 | 244/3.27 |
| 6,497,600 B1 * | 12/2002 | Levy | B64C 17/00 | 446/34 |
| 6,834,835 B1 * | 12/2004 | Knowles | B64C 3/54 | 244/198 |
| 7,582,977 B1 * | 9/2009 | Dehlsen | F03B 17/061 | 290/1 R |
| 7,637,454 B2 * | 12/2009 | Pitt | B64C 3/52 | 244/123.8 |
| 7,811,151 B2 * | 10/2010 | Conrad | A63H 27/02 | 446/62 |
| 8,089,034 B2 * | 1/2012 | Hammerquist | B64C 3/56 | 244/3.28 |
| 8,342,447 B2 * | 1/2013 | Etling | B64C 9/00 | 244/90 R |
| 8,419,362 B2 * | 4/2013 | Bertolotti | F03D 7/0236 | 416/1 |
| 8,584,984 B2 * | 11/2013 | Parks | B64C 3/56 | 244/49 |
| 8,651,431 B1 * | 2/2014 | White | B64C 23/076 | 244/218 |
| 10,214,278 B2 * | 2/2019 | Briancourt | B64C 23/072 | |
| 10,392,101 B2 * | 8/2019 | Axford | B64C 3/56 | |
| 10,583,909 B2 * | 3/2020 | Alexander | B64C 3/42 | |
| 10,676,173 B2 * | 6/2020 | Thompson | B64C 3/56 | |
| 2002/0066825 A1 * | 6/2002 | Miralles | B64C 39/024 | 244/49 |
| 2003/0080243 A1 * | 5/2003 | Hoisignton | B60V 1/08 | 244/13 |
| 2004/0159227 A1 * | 8/2004 | Richards | B64C 3/56 | 89/1.4 |
| 2005/0218260 A1 * | 10/2005 | Corder | B64C 3/56 | 244/49 |
| 2010/0170995 A1 * | 7/2010 | Maenz | B64C 1/26 | 244/131 |
| 2012/0280080 A1 * | 11/2012 | Lubenow | B64C 39/024 | 244/49 |
| 2012/0292436 A1 * | 11/2012 | Karem | B64C 3/56 | 244/49 |
| 2013/0336795 A1 | 12/2013 | Parker | | |
| 2013/0341467 A1 * | 12/2013 | Sakurai | B64C 3/56 | 244/201 |
| 2015/0336657 A1 * | 11/2015 | Townsend | B64C 3/56 | 244/49 |
| 2016/0244145 A1 * | 8/2016 | Thompson | B64C 23/072 | |
| 2016/0244153 A1 * | 8/2016 | McMahon | B64C 3/38 | |
| 2016/0332721 A1 * | 11/2016 | Hancock | B64C 3/56 | |
| 2016/0332723 A1 * | 11/2016 | Korya | B64C 3/56 | |
| 2017/0029089 A1 * | 2/2017 | Alexander | B64C 3/40 | |
| 2017/0137110 A1 * | 5/2017 | Harding | B64C 13/28 | |
| 2017/0137111 A1 * | 5/2017 | Harding | B64C 3/56 | |
| 2017/0152016 A1 * | 6/2017 | Napier | B64C 3/185 | |
| 2017/0190410 A1 * | 7/2017 | Good | B64C 9/24 | |
| 2017/0321804 A1 * | 11/2017 | Soman | B64C 3/56 | |
| 2017/0334543 A1 * | 11/2017 | Wildman | B64C 23/072 | |
| 2017/0355436 A1 * | 12/2017 | Thompson | B64C 3/56 | |
| 2017/0355437 A1 * | 12/2017 | Bishop | B64C 23/072 | |
| 2017/0355438 A1 * | 12/2017 | Bishop | B64C 3/56 | |
| 2017/0355440 A1 * | 12/2017 | Bishop | B64C 3/56 | |
| 2017/0369151 A1 * | 12/2017 | Thompson | B64C 3/56 | |
| 2018/0170519 A1 * | 6/2018 | Brakes | F16F 7/08 | |
| 2019/0161162 A1 * | 5/2019 | Bishop | B64C 3/56 | |

FOREIGN PATENT DOCUMENTS

| | | |
|---|---|---|
| GB | 2551185 | 12/2017 |
| GB | 2551187 | 12/2017 |
| WO | 2015/150835 | 10/2015 |

\* cited by examiner

View along axis 1011

View along axis 1011

MOVEABLE WING TIP DEVICE, AN OUTER END OF A WING, AND INTERFACE THEREBETWEEN

CROSS RELATED APPLICATION

This application claims priority to United Kingdom (GB) Patent Application 1804361.2, filed Mar. 19, 2018, the entire contents of which are hereby incorporated by reference.

BACKGROUND OF THE INVENTION

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

To address this problem, various arrangements comprising movable wing tip devices, that specifically enable the span to be reduced in a ground configuration, have been suggested.

WO2015/150835 is an example of a suggested arrangement. In the arrangement of WO2015/150835 the wing tip device and the fixed wing are separated along an oblique cut plane and the wing tip device is rotatable about an axis of rotation perpendicular to that cut plane.

In the arrangement of WO2015/150835, sealing the interface between the fixed wing and the wing tip device (when the wing tip device is in the flight configuration) has been found to be problematic. More specifically, as the wing tip device rotates between the flight and the ground configurations, relative sliding motion occurs at the interface between the outer end of the fixed wing and the inner end of the wing tip device. Whilst a sliding seal may, in principle, be employed, such a solution is sub-optimal because sliding seals tend to be subjected to relatively large amounts of wear. This may make them susceptible to wear and/or damage and may therefore necessitate frequent inspection and/or replacement of the seal.

GB2551185 suggests an arrangement in which the outer end of the fixed wing and the inner end of the wing tip device meet along an interfacing cut line that separates the outer surfaces of the fixed wing and the wing tip device. The contents of GB2551185 are incorporated herein by reference. In an embodiment described in GB2551185, the interfacing cut line comprises: a first length, formed by a cut through the outer surface, but offset from the primary cut plane in a first direction; a second length, formed by a cut through the outer surface but offset from the primary cut plane in a second direction, opposite to the first direction; and a transition section over which the interfacing cut line transitions from the first length to the second length. The wing tip device may contact the fixed wing at a sliding contact along the transition section, but the wing tip device separates away from the fixed wing along the first length and second lengths. In embodiments suggested GB2551185, the first length may be in a first plane that is parallel to the primary cut plane but offset from the primary cut plane in the first direction, and the second length may be in a second plane that is parallel to the primary cut plane but offset from the primary cut plane in the second direction.

Aspects of the present invention seek to provide yet further improvements to the interface between the fixed wing and the wing tip device.

SUMMARY OF THE INVENTION

According to a first aspect, there is provided an aircraft comprising a wing, the wing having a fixed wing with a wing tip device movably mounted at the outer end thereof, the wing tip device being movable between: (a) a flight configuration for use during flight; and (b) a ground configuration for use during ground-based operations, in which ground configuration the wing tip device is moved away from the flight configuration such that the span of the aircraft wing is reduced, wherein the wing tip device and the fixed wing are separated along a primary cut plane, the primary cut plane being obliquely orientated, and the wing tip device being rotatable between the flight and ground configurations, about an axis of rotation orientated normal to the primary cut plane, and wherein when the wing tip device is in the flight configuration, an outer end of the fixed wing and an inner end of the wing tip device meet along an interfacing cut line that separates the outer surfaces of the fixed wing and the wing tip device, the interfacing cut line comprising: a curved section curving around the axis of rotation, the curved section extending both fore and aft of the axis of rotation; and wherein the outer end of the fixed wing comprises a first interfacing surface corresponding with the curved section of the interfacing cut line, the inner end of the wing tip device comprises a second interfacing surface corresponding with the curved section of the interfacing cut line, and wherein when the wing tip device is in the flight configuration: at a location fore of the axis of rotation, the first interfacing surface and second interfacing surface are at a first inclination to the axis of rotation, and the first interfacing surface and second interfacing surface twist as they pass along the length of the curved section such that at a location aft of the axis of rotation, the first interfacing surface and second interfacing surface are orientated at a second, opposite inclination to the axis of rotation.

The first inclination and second inclination, whilst opposite, do not have to be equal and opposite. Therefore, the first inclination may be more or less angled to the axis of rotation than the second inclination. However, it is a key factor that the orientation of the inclination is reversed. Another way of viewing this might be to consider that the first inclination is a positive inclination, and the second inclination is a negative inclination when compared to the axis of rotation.

The first interfacing surface and second interfacing surface may be arranged such that at all locations fore of the axis of rotation they are oriented at a first, varying orientation to the axis of rotation. The first interfacing surface and second interfacing surface may be arranged such that at all locations aft of the axis of rotation they are oriented at a second, opposite, varying orientation to the axis of rotation. At the point of inflection of the twist from the first orientation to the second orientation, the first interfacing surface and second interfacing surface may be oriented parallel to the axis of rotation.

The twisting angle of inclination of the first interfacing surface and second interfacing surface means that under rotational movement of the wing tip device from the flight configuration to ground configuration there is a local translational movement of the first and second interfacing surfaces away from each other. The initial movement tends to be a local translation in a mutually perpendicular direction. This provides an improved arrangement, where movement of the wing tip device from the flight configuration to ground configuration is easier, and not subject to frictional or binding forces between the first interfacing surface and second interfacing surface. An additional sealing surface or element may be provided between the first interfacing surface and second interfacing surface when the wing tip device is in the flight configuration. The sealing surface or element may run along the entire length of the interfacing cut line. The sealing surface or element may comprise a resiliently deformable material, such that when the wing tip device is in the flight configuration, the sealing surface or element is compressed between the first interfacing surface and second interfacing surface. The sealing surface or element acts to improve the seal between the fixed wing and wing tip device when in the flight configuration, thereby improving the aerodynamic performance of the wing. The sealing surface or element may be permanently fixed to one of the first interfacing surface and second interfacing surface.

The transition of the first interfacing surface and second interfacing surface from the first inclination to the second, opposite, inclination, may be continuous.

The fixed wing may comprise an upper wing skin, the first interfacing surface being an end face of the upper wing skin facing in a downwards direction to the fore of the axis of rotation and an upwards direction to the aft of the axis of rotation. The wing tip device may comprise an upper wing tip skin, the second interfacing surface being an end face of the upper wing tip skin facing in an upwards direction to the fore of the axis of rotation and a downwards direction to the aft of the axis of rotation. The upwards and downwards directions may be defined relative to the conventional vertical Z-axis when the aircraft is on the ground, or locally relative to the orientation of the wing.

The fixed wing may comprise a lower wing skin, the first interfacing surface being an end face of the lower wing skin facing in a downwards direction to the fore of the axis of rotation and a upwards direction to the aft of the axis of rotation. The wing tip device may comprise a lower wing tip skin, the second interfacing surface being an end face of the lower wing tip skin facing in an upwards direction to the fore of the axis of rotation and an downwards direction to the aft of the axis of rotation.

The radius of the curved section may constantly increase as the cut line passes around the axis, for example the curved section may trace a spiral path around the axis. The radius of the curved section may increase towards the leading edge of the wing, such that the foremost point of the curved section has the largest radius, and the aftmost point of the curved section has the smallest radius.

The wing comprises may comprise a sealing assembly for sealing between the fixed wing and the wing tip device when the wing tip device is in the flight configuration, and wherein the sealing assembly comprises a compression seal for making/breaking a seal under a relative coming together/separation of the fixed wing and wing tip device, the compression seal being associated with curved section.

The interfacing cut line may comprise (i) a first length, formed by a cut through the outer surface, that is offset from the primary cut plane in a first direction; (ii) a second length, formed by a cut through the outer surface that extends within a plane containing the axis of rotation, or within a plane parallel thereto; and (iii) wherein the curved section centred on the axis of rotation is a transition section over which the interfacing cut line transitions from the first length to the second length. The second length may be formed by a cut through the outer surface that extends within the plane containing the axis of rotation. The plane within which the second length extends, may be orientated in the line-of-flight direction. The fixed wing may comprise a front spar and the plane within which the second length extends, may be orientated perpendicular to the front spar. The first length may be located aft of the axis of rotation, and second length is located fore of the axis of rotation.

The wing may comprise an upper surface extending from the leading edge, over the wing, to the trailing edge, and a lower surface extending from the leading edge, under the wing, to the trailing edge, and wherein the first length is along the upper surface of the wing, and the second length extends along the upper surface of the wing, passes through the leading edge and extends onto the lower surface of the wing. The interfacing cut line may further comprise: (iii) a third length, on the lower surface of the wing that is formed by a cut through the outer surface that is offset from the primary cut plane in a second direction, opposite to the first direction; and (iv) a further transition section over which the interfacing cut line transitions from the third length to the part of the second length on the lower surface. The interfacing cut line may comprise a further transition section between the first and third lengths, such that the interfacing cut line is made up of the first to third lengths, each length transitioning into the adjacent length by a respective transition section. The third length may be located aft of the axis of rotation. The first length may be curved and the curve shaped such that it does not lie within a single plane. The wing may comprise a sealing assembly for sealing between the fixed wing and the wing tip device when the wing tip device is in the flight configuration, and wherein the sealing assembly comprises a compression seal for making/breaking a seal under a relative coming together/separation of the fixed wing and wing tip device, the compression seal being associated with the first and second lengths.

Separating the interfacing cut line into the first and second lengths has been found to be beneficial. Since the first length is offset from the primary cut plane, when the wing tip device rotates about its axis of rotation there tends to be limited, or no, sliding contact movement along this length. Instead, the fixed wing and the wing tip device tend to separate along the first length under a local translational movement. This is beneficial because it may enable a non-sliding seal (for example a compression seal) to be employed along this length. In addition, providing a second length that is formed by a cut through the outer surface that lies substantially within a plane containing the axis of rotation, or within a plane parallel thereto, has been found to be especially beneficial. It has been recognised that by forming the second length in this manner, the orientation of the second length of the interfacing cut line tends to mean the fixed wing and the wing tip device separate (along the second length) in a locally perpendicular direction. Thus the sealing movement tends to be a pure compression. The second length, is preferably formed by a cut through the outer surface that extends within the plane containing the axis of rotation, or within a plane parallel thereto, such that the fixed wing and the wing tip device separate (along the second length) in a locally perpendicular direction as the wing tip device moves from the flight configuration towards the ground configuration.

The second length is preferably formed by a cut through the outer surface that lies substantially within a plane containing the axis of rotation. Providing a cut in this orientation, may enable the fixed wing and wing tip device to separate simultaneously along the full length of the second cut line, as the wing tip device moves from the flight configuration towards the ground configuration (and vice versa that the fixed wing and wing tip device meet simultaneously along the full length of the second cut line as the wing tip device moves into the flight configuration). The second length is preferably formed by a cut through the outer surface that extends within the plane containing the axis of rotation, such that the fixed wing and wing tip device to separate simultaneously along the full length of the second cut line, as the wing tip device moves from the flight configuration towards the ground configuration.

When the wing tip device rotates from the flight configuration to the ground configuration, the wing tip device may separate away from the fixed wing along the first length and second length. The separation is preferably a translational movement of the opposing parts of the fixed wing and the wing tip device, away from each other. It will be appreciated that the wing tip device rotates about the axis of rotation, so the separation/translational movement referred to is a local movement in the vicinity of the interface—when considering the wing tip device as a whole, it rotates relative to the fixed wing. There is preferably no sliding contact along the second length. There is preferably no sliding contact along the first length.

According to a second aspect of the invention, there may be provided an aircraft wing for use as the wing according to the first aspect of the invention, the wing having a fixed wing with a wing tip device movably mounted at the outer end thereof, the wing tip device being movable between: (a) a flight configuration for use during flight; and (b) a ground configuration for use during ground-based operations, in which ground configuration the wing tip device is moved away from the flight configuration such that the span of the aircraft wing is reduced, wherein the wing tip device and the fixed wing are separated along a primary cut plane, the primary cut plane being obliquely orientated, and the wing tip device being rotatable between the flight and ground configurations, about an axis of rotation orientated normal to the primary cut plane, and wherein when the wing tip device is in the flight configuration, an outer end of the fixed wing and an inner end of the wing tip device meet along an interfacing cut line that separates the outer surfaces of the fixed wing and the wing tip device, the interfacing cut line comprising: a curved section curving around the axis of rotation, the curved section extending both fore and aft of the axis of rotation; and wherein the outer end of the fixed wing comprises a first interfacing surface corresponding with the curved section of the interfacing cut line, the inner end of the wing tip device comprises a second interfacing surface corresponding with the curved section of the interfacing cut line, and wherein when the wing tip device is in the flight configuration: at a location fore of the axis of rotation, the first interfacing surface and second interfacing surface are at a first inclination to the axis of rotation, and the first interfacing surface and second interfacing surface twist as they pass along the length of the curved section such that at a location aft of the axis of rotation, the first interfacing surface and second interfacing surface are orientated at a second, opposite inclination to the axis of rotation.

According to a third aspect of the invention, there may be provided a fixed wing, for use as the fixed wing in any of the first or second aspect of the invention, the fixed wing being configured to receive a wing tip device, the wing tip device being movable between: (a) a flight configuration for use during flight; and (b) a ground configuration for use during ground-based operations, in which ground configuration the wing tip device is moved away from the flight configuration such that the span of the aircraft wing is reduced, wherein the wing tip device and the fixed wing are separated along a primary cut plane, the primary cut plane being obliquely orientated, and the wing tip device being rotatable between the flight and ground configurations, about an axis of rotation orientated normal to the primary cut plane, and wherein when the wing tip device is in the flight configuration, an outer end of the fixed wing and an inner end of the wing tip device meet along an interfacing cut line that separates the outer surfaces of the fixed wing and the wing tip device, the interfacing cut line comprising: a curved section curving around the axis of rotation, the curved section extending both fore and aft of the axis of rotation; and wherein the outer end of the fixed wing comprises a first interfacing surface corresponding with the curved section of the interfacing cut line, the inner end of the wing tip device comprises a second interfacing surface corresponding with the curved section of the interfacing cut line, and wherein when the wing tip device is in the flight configuration: at a location fore of the axis of rotation, the first interfacing surface and second interfacing surface are at a first inclination to the axis of rotation, and the first interfacing surface and second interfacing surface twist as they pass along the length of the curved section such that at a location aft of the axis of rotation, the first interfacing surface and second interfacing surface are orientated at a second, opposite inclination to the axis of rotation.

According to a fourth aspect of the invention, there is provided a wing tip device for use as the wing tip device in any of the first, second or third aspect of the invention, the wing tip device being configured to be received on a fixed wing, the wing tip device being movable between: (a) a flight configuration for use during flight; and (b) a ground configuration for use during ground-based operations, in which ground configuration the wing tip device is moved away from the flight configuration such that the span of the aircraft wing is reduced, wherein the wing tip device and the fixed wing are separated along a primary cut plane, and the wing tip device being rotatable between the flight and ground configurations, about an axis of rotation orientated normal to the primary cut plane, and wherein when the wing tip device is in the flight configuration, an outer end of the fixed wing and an inner end of the wing tip device meet along an interfacing cut line that separates the outer surfaces of the fixed wing and the wing tip device, the interfacing cut line comprising: a curved section curving around the axis of rotation, the curved section extending both fore and aft of the axis of rotation; and wherein the outer end of the fixed wing comprises a first interfacing surface corresponding with the curved section of the interfacing cut line, the inner end of the wing tip device comprises a second interfacing surface corresponding with the curved section of the interfacing cut line, and wherein when the wing tip device is in the flight configuration: at a location fore of the axis of rotation, the first interfacing surface and second interfacing surface are at a first inclination to the axis of rotation, and the first interfacing surface and second interfacing surface twist as they pass along the length of the curved section such that at a location aft of the axis of rotation, the first interfacing surface and second interfacing surface are orientated at a second, opposite inclination to the axis of rotation.

The wing tip device is rotatable between the flight and ground configurations, about an axis of rotation. The orientation of the axis is preferably such that when the wing tip device is rotated about the axis, from the flight configuration to the ground configuration, the span of the aircraft wing is reduced.

The axis of rotation is orientated normal to a primary cut plane. The primary cut plane is preferably oblique. The cut plane preferably extends through the upper and lower surfaces of the wing. The distance, along the upper surface of the wing, from the root of the wing to the cut plane (i.e. to where the cut plane intersects the upper surface) may be less than the distance, along the lower surface of the wing, from the root of the wing to the cut plane (i.e. to where the cut plane intersects the lower surface). Thus, the cut plane may create an overcut with respect to the fixed wing. In other embodiments, the distance, along the upper surface of the wing, from the root of the wing to the cut plane (i.e. to where the cut plane intersects the upper surface) may be more than the distance, along the lower surface of the wing, from the root of the wing to the cut plane (i.e. to where the cut plane intersects the lower surface). Thus, the cut plane may create an undercut with respect to the fixed wing.

The primary cut plane is preferably a notional plane separating the fixed wing and the wing tip device (for example a cut plane created during the design phase of the wing). It will be appreciated that the cut plane need not necessarily manifest itself as a physical, planar, surface throughout the depth of the wing. The primary cut plane will be readily identifiable to the skilled person. The primary cut plane may be the plane within which the wing tip device rotates. Some embodiments of the invention may comprise a bearing, such as a slew ring, for supporting rotation of the wing tip device. The bearing may be co-axial with the rotational axis. The primary cut plane may extend through the thickness of the bearing, and typically through the mid-thickness of the bearing (i.e. the mid-thickness of the bearing is co-planar with the primary cut plane).

The axis of rotation may be orientated at an angle to (i.e. not including being parallel or perpendicular to) a longitudinal direction. The axis is preferably at an angle to (i.e. not including being parallel or perpendicular to) a lateral direction. The axis is preferably at an angle to (i.e. not including being parallel or perpendicular to) a vertical direction. The vertical, longitudinal and lateral directions may be mutually perpendicular. In some embodiments, the longitudinal, lateral and vertical directions may be in an absolute frame of reference (i.e. longitudinal is fore-aft, lateral is port-starboard and vertical is vertical from the ground). The longitudinal direction may be a chordwise direction; the lateral direction may be a spanwise direction. In other embodiments, it may be appropriate to use the longitudinal, lateral and vertical directions in a frame of reference local to the wing. For example, for a swept wing the longitudinal direction may instead be along the length of the wing, and the lateral direction may be along the width of the wing (i.e. from the leading to the trailing edges, measured perpendicular to the longitudinal direction). Alternatively or additionally, for a wing with dihedral, the vertical direction may be perpendicular to the plane of the wing. In all cases, the cut plane/axis is orientated such that the span of the wing is reduced when the wing tip device is rotated about the axis. The determination of fore and aft of the axis of rotation may be by reference to a boundary defined by an axis perpendicular to the longitudinal axis of the aircraft and intersecting the axis of rotation. All points towards the front of the aircraft relative to the boundary may be considered fore of the rotational axis and all points to the rear of the aircraft relative to the boundary may be considered aft of the rotational axis. Alternatively, the fore and aft locations may be determined in a frame of reference local to the wing. The boundary may be aligned intersecting the axis of rotation and parallel to the leading edge of the wing. The aircraft wing may comprise a spar running in an approximately span-wise direction, and the boundary may be aligned intersecting the axis of rotation and parallel to the spar.

The orientation of the first interfacing surface may be arranged such that when the local movement of the second interfacing surface is in a downwards direction when the wing tip device is moved away from the flight configuration to the ground configuration, the first interfacing surface points in a downwards direction. The orientation of the first interfacing surface may be arranged such that when the local movement of the second interfacing surface is in an upwards direction when the wing tip device is moved away from the flight configuration to the ground configuration, the first interfacing surface points in an upwards direction. By orienting the interfacing surfaces such that they move apart from each other locally as the wing tip device is moved from the flight configuration to the ground configuration means that the separation is clean, with little or no friction resulting from sliding movement. Such an arrangement may improve the wear characteristics of the interfacing surfaces. Additionally, orienting the interfacing surfaces such that when the wing tip device is moved from the ground configuration to the flight configuration the surfaces move locally towards each other allows for engagement with and compression of a seal located between the first interfacing surface and second interfacing surface.

The wing tip device is preferably rotatable about a single axis of rotation. For example, the rotation of the wing tip device is preferably not the result of a compound rotation (I.e. a net rotation created by a plurality of separate rotations about separate axes).

The axis is preferably at an angle of less than 45 degrees, and more preferably less than 25 degrees, from the vertical. The axis may be at an angle of 15 degrees from the vertical axis. The present invention has been found to be especially beneficial in embodiments in which the axis is at a relatively small angle from the vertical because the orientation of axis results in a shallow cut plane and the area of the interface between the fixed wing and wing tip device may therefore be relatively large.

Embodiments of the present invention have been found to be especially beneficial when there is a desire to create a seal between the fixed wing and the wing tip device. The wing may comprise a sealing assembly for sealing between the fixed wing and the wing tip device when the wing tip device is in the flight configuration.

The sealing assembly may comprise a compression seal for making/breaking a seal under a relative coming together/separation of the fixed wing and wing tip device. The compression seal may be associated with the first and second lengths.

The wing may comprise a seal support structure located along the second length. The second seal support structure may be orientated parallel to the plane containing the second cut line (for example along the thickness of the wing skin and co-planar with the plane within which the second length extends. This may be beneficial because it can support the seal undergoing pure compression (i.e. compression in a direction perpendicular to the plane containing the second line).

In principle, the cut forming the second length may be orientated in a number of different directions (so long as the plane it lies in (or is parallel to) also contains the axis of rotation). In some embodiments, the cut forming the second length is orientated in the line-of-flight direction. Such an arrangement tends to be preferable from the aerodynamic point of view. In some other embodiments, the fixed wing comprises a front spar and the cut forming the second length is orientated perpendicular to the front spar. Such an arrangement tends to facilitate integration of the wing tip device with a fixed wing having a leading edge slat in the region of the tip.

The first length is preferably located aft of the axis of rotation. The second length is preferably located fore of the axis of rotation.

The wing may comprise an upper surface extending from the leading edge, over the wing, to the trailing edge. The wing may comprise a lower surface extending from the leading edge, under the wing, to the trailing edge. The first length may be along the upper surface of the wing. The second length may extend along the upper surface of the wing, and may pass through the leading edge and extend onto the lower surface of the wing. Such an arrangement is especially beneficial when the first and second lengths are either side of the axis of rotation, as the lengths on the same (upper or lower) surface will tend to move in opposite directions as the wing tip device rotates. By having the second cut line extending within the specified plane, it is possible to extend the cut line from the upper surface to the lower surface at the leading edge of the wing because the fixed wing and wing tip device simply separate way from each other along this line and there is no need to transition to a different cut line on the lower surface. Such an arrangement may also enable a single seal assembly to be provided along this entire length.

The interfacing cut line may further comprise: (iii) a third length, on the lower surface of the wing that is formed by cut through the outer surface. The third length may be offset from the primary cut plane in a second direction, preferably opposite to the first direction. The interfacing cut line may also comprise (iv) a further transition section over which the interfacing cut line transitions from the third length to the part of the second length on the lower surface.

The wing tip device may separate away from the fixed wing along the third length. The separation is preferably a translational movement of the opposing parts of the fixed wing and the wing tip device, away from each other.

In embodiments in which the second length is located fore of the axis of rotation and the first length is located aft of the axis of rotation, a third length is preferably located aft of the axis of rotation.

The interfacing cut line may comprise further a transition section between the first and third lengths. The further transition section(s) are preferably such that the interfacing cut line is made up of the first to third lengths, each length transitioning into the adjacent length by a respective transition section. The further transition section between the first and third section may be in the vicinity of the trailing edge of the wing.

In principle, the first length may be in a number of different shapes. For example, as per the arrangement in GB1610108.1, the first length may be in a first plane that is parallel to the primary cut plane but offset from the primary cut plane in the first direction. In preferred embodiments, the first length is curved and the curve is shaped such that it does not lie within a single plane. In other words, the curve is preferably not formed by an intersection of a plane with the outer surface of the wing. Having the first length in such a curved shape has been found to be beneficial in terms of the resulting relative movement between the fixed wing and the wing tip device along the interface (when the wing tip device rotates about the axis). Furthermore, it may facilitate a relatively small transition section between the first length, and a third length, in the region of the trailing edge because the ends of those lengths can be brought closer together, whilst still avoiding any potential clash.

The first length is preferably offset from the primary cut plane in an inboard direction.

In the transition section, the interfacing cut line transitions from the first length to the second length. The transition section may be relatively short. The transition section may be shorter than the first and the second lengths.

In principle, the transition section may take a number of forms. In a preferred embodiment of the invention, the transition section is a curved section centred on the axis of rotation, the radius of the curved section continuously increasing as the cut line passes around the axis. Providing an interface having a curved section in which the radius of the curved section continuously increases around the axis of rotation, has been found to be especially beneficial. In particular, since the radius of the curved section of the interfacing cut line increases, and that curved section of the interfacing cut line is centred on the rotational axis of the wing tip, it means that the structure of the wing tip device separates away from the structure of the fixed wing along the interfacing cut line as the wing tip device rotates away from the flight configuration.

The radius of the curved section preferably increases as the cut line passes around the axis in the direction of rotation that moves the wing tip device from the flight configuration to the ground configuration. Correspondingly, the radius of the curved section preferably constantly decreases as the cut line passes around the axis in the direction of rotation that moves the wing tip device from the ground configuration to the flight configuration.

The above-mentioned directions are to be considered from a view along the axis of rotation, towards the surface of the wing on which the interfacing cut line lies. For example, in embodiments on which the curved section of the interfacing cut line is located on the upper surface of the wing, the directions are considered from a view along the axis of rotation onto that upper surface. In general, unless otherwise specified, it will be appreciated that references to the shape, radius or other features of the interfacing cut line are to be taken when viewing the cut line in this direction along the axis of rotation, and onto the surface of the wing on which the relevant part of the interfacing cut line lies. In other words the features of the curved section may be considered with reference to a projection of the curved section onto a plane that is perpendicular to the axis of rotation.

In embodiments comprising a plurality of transition sections, it will be appreciated that any features herein described with reference to one transition section may apply equally to any or all of the other transition sections.

In embodiments of the present invention, the wing tip device is configurable between: (a) a flight configuration for use during flight and (b) a ground configuration for use during ground-based operations, in which ground configuration the wing tip device is moved away from the flight configuration such that the span of the aircraft wing is reduced. In the flight configuration, the span may exceed an airport compatibility limit. In the ground configuration the span may be reduced such that the span (with the wing tip device in the ground configuration) is less than, or substantially equal to, the airport compatibility limit. The airport compatibility limit is a span limit (for example relating to clearance restrictions for buildings, signs, other aircraft). The compatibility limit is preferably a gate limit.

The wing tip device may be a wing tip extension; for example the wing tip device may be a planar tip extension. In other embodiments, the wing tip device may comprise, or consist of, a non-planar device, such as a winglet.

In the flight configuration the trailing edge of the wing tip device is preferably a continuation of the trailing edge of the fixed wing. The leading edge of the wing tip device is preferably a continuation of the leading edge of the fixed wing. There is preferably a smooth transition from the fixed wing to the wing tip device. It will be appreciated that there may be a smooth transition, even where there are changes in sweep or twist at the junction between the fixed wing and wing tip device. However, there are preferably no discontinuities at the junction between the fixed wing and wing tip device. The upper and the lower surfaces of the wing tip device may be continuations of the upper and lower surfaces of the fixed wing. The span ratio of the fixed wing relative to the wing tip device may be such that the fixed wing comprises 70%, 80%, 90%, or more, of the overall span of the aircraft wing.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not movable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to yet another aspect of the invention, there is provided an aircraft comprising a wing, the wing having a fixed wing with a wing tip device movably mounted at the outer end thereof, the wing tip device being movable between: (a) a flight configuration for use during flight; and (b) a ground configuration for use during ground-based operations, in which ground configuration the wing tip device is moved away from the flight configuration such that the span of the aircraft wing is reduced. The wing tip device is rotatable between the flight and ground configurations, about an inclined axis of rotation, such that the wing tip device rotates upwards and rearwards when moving from the flight to ground configurations. When the wing tip device is in the flight configuration, the outer end of the fixed wing and the inner end of the wing tip device meet along an interfacing cut line that separates the outer surfaces of the fixed wing and the wing tip device. The interfacing cut line comprises a leading edge section passing over the upper surface, through the leading edge and onto the lower surface, the leading edge section of the cut line being formed by a cut that extends within a plane containing the axis of rotation, and the interfacing cut line comprises an upper surface section located on the upper surface and to the rear of the axis of rotation and being offset inboard from the plane containing the axis of rotation; and the interfacing cut line also comprises a lower surface section located on the lower surface to the rear of the axis of rotation and being offset outboard from the plane containing the axis of rotation. The ends of the leading edge section may adjoin respective curved sections which link the leading edge section with the upper and lower surface sections respectively, each curved section being centred on the axis of rotation, the radius of the curved sections constantly increasing as the cut line passes around the axis.

According to a further aspect, the invention may comprise a method of designing an aircraft, or aircraft wing, the aircraft or aircraft wing as described with reference to either the first or second aspect of the invention, the method comprising the step of designing a first interfacing surface and second interfacing surface, wherein the first interfacing surface and second interfacing surface are located along an interfacing cut line between a fixed wing and wing tip device, wherein the orientation of the first interfacing surface and second interfacing surface twists from one end of the interfacing cut line to another end of the interfacing cut line.

It will be appreciated that any features described with reference to one aspect of the invention are equally applicable to any other aspect of the invention, and vice versa. For example features described with reference to the aircraft of the first aspect may also be applicable to the wing, wing tip device and/or methods of the other aspects of the invention, and vice versa.

The term 'or' shall be interpreted as 'and/or' unless the context requires otherwise.

DESCRIPTION OF THE DRAWINGS

Embodiments of the present invention will now be described by way of example only with reference to the accompanying schematic drawings of which:

FIG. 3b is a frontal view of the aircraft incorporating the wing of FIG. 3a;

FIG. 5b is a plan view looking in a direction along the axis of rotation of the wing tip device in FIG. 5a;

FIG. 7 is a frontal view along the arrow A of FIG. 6a;

DETAILED DESCRIPTION

Figure 1A:
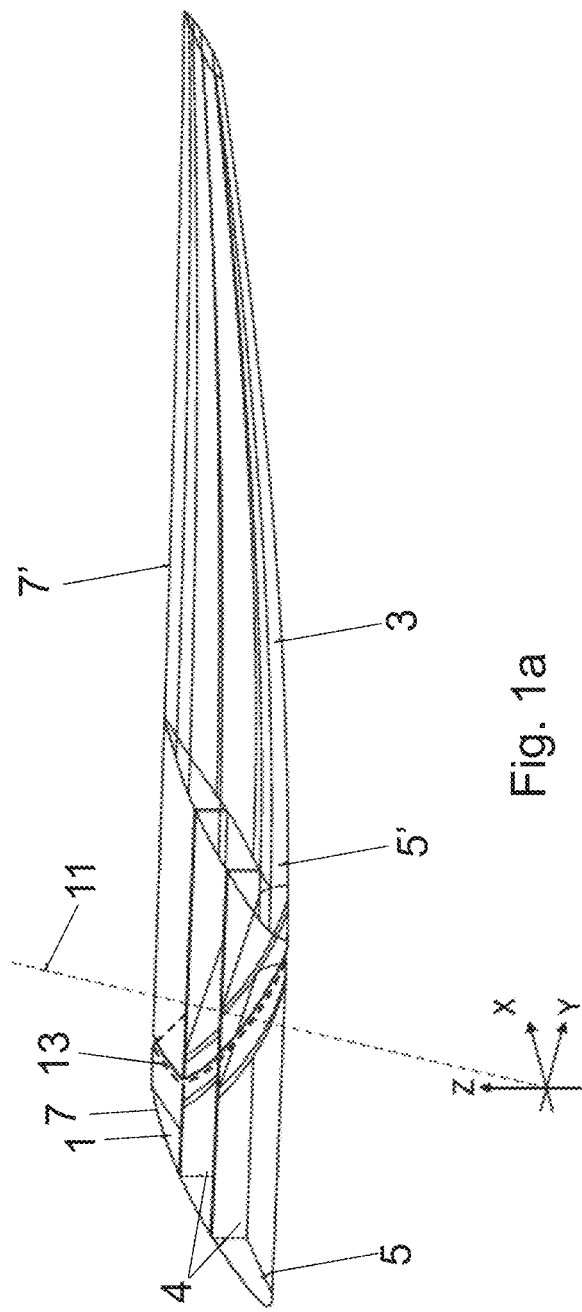
FIGS. 1a and 1b show a wing with a movable wing tip device of the prior art.
Figure 1B:
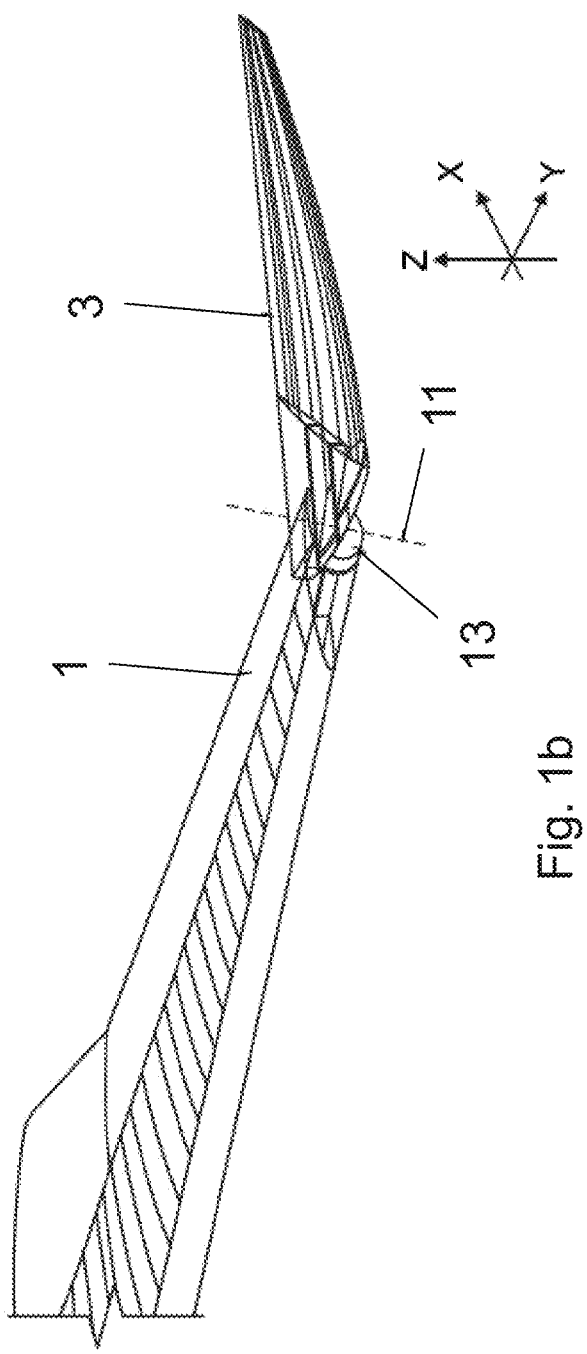

FIG. 1a is a perspective view of a fixed wing 1 and a wing tip device 3 on an aircraft shown in WO2015/150835. In summary, the wing tip device 3 is movable between a flight configuration (FIG. 1a) and a ground configuration (FIG. 1b). In the flight configuration, the leading and trailing edges 5', 7' of the wing tip device 3 are continuations of the leading and trailing edges 5, 7 of the fixed wing 1. Furthermore, the upper and lower surfaces of the wing tip device 3 are continuations of the upper and lower surfaces of the fixed wing 1.

The wing tip device 3 is placed in the flight configuration for flight. In the flight configuration, the wing tip device 3 thus increases the span of the aircraft (thereby providing beneficial aerodynamic effects, for example, reducing the component of induced drag and increasing the lift). In principle, it would be desirable to maintain this large span at all times and simply have a large fixed wing. However, the maximum aircraft span is effectively limited by airport operating rules which govern various clearances required when manoeuvring around the airport (such as the span and/or ground clearance required for gate entry and safe taxiway usage). Thus, the wing tip device 3 is movable to a ground configuration for use when on the ground.

In the ground configuration (FIG. 1b) the wing tip device 3 is folded, from the above-mentioned flight configuration, by rotating the wing tip device 3 about a rotational axis 11. By folding the wing tip device 3 in this manner, the span of the aircraft 2 is reduced. When the wing tip device 3 is in the ground configuration, the aircraft 2 thus complies with the above-mentioned airport clearances etc.

The movement of the wing tip devices is determined by the type of joint about which the wing tip device rotates relative to the fixed wing. To achieve the above-mentioned movement, the wing tip device 3 and the fixed wing 5 are separated along an oblique cut plane 13 passing through the upper and lower surfaces of the wing. The wing tip device 3 is rotatable about the axis 11 that extends in a direction perpendicular to the oblique cut plane 13. The axis 11 is orientated at an acute angle to all three mutually perpendicular axes X, Y and Z (i.e. chordwise, spanwise and vertical).

Small gaps, steps or other mismatch at the interface between the outer end of the fixed wing and the inner end of the wing tip device, when the movable wing tip device is in the flight configuration, can create aerodynamic penalties (e.g. drag and pressure leakage). In some movable wing tip arrangements, such as the one described above with reference to FIGS. 1a and 1b, it has been difficult to provide an interface that eliminates these features. For example, in some arrangements, controlling the tolerances in the vicinity of the interface has been found to be difficult. It has also been found to be difficult to provide an effective sealing arrangement to inhibit leakage flow through the interface.

Figure 2:
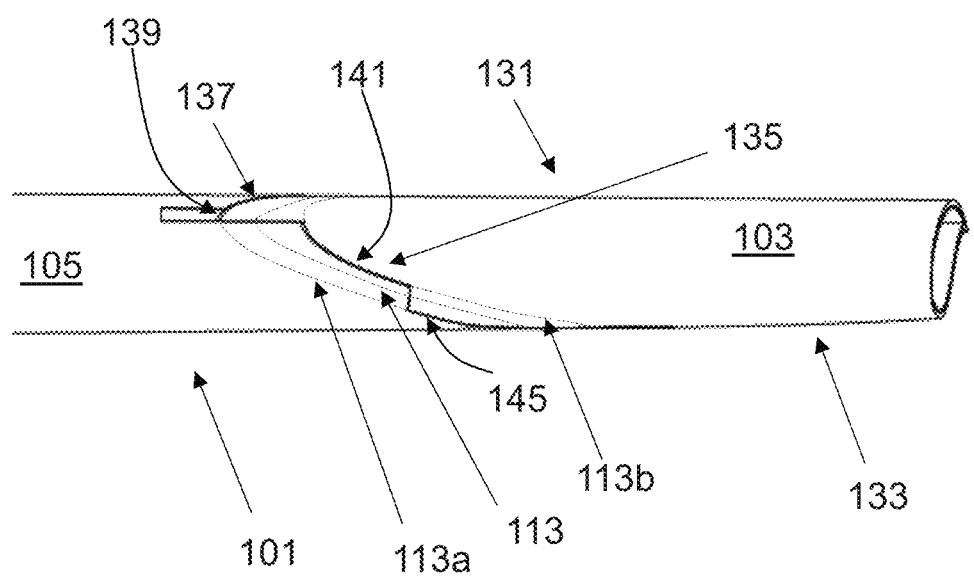
FIG. 2 is an above-frontal view of a suggested embodiment in unpublished application GB1610108.1, showing the fixed wing/wing tip device interface, the interfacing cut-lines and the cut planes.

FIG. 2 is an above-frontal view of a suggested embodiment in unpublished application GB1610108.1. FIG. 2 shows the wing 101 in the vicinity of the joint between the fixed wing 105 and wing tip device 103. The wing 101 has an upper surface 131 and a lower surface 133. The fixed wing 105 and the wing tip device 103 are separated along the notional primary cut plane 113 (to which the axis of rotation is perpendicular).

The primary cut plane 113 is indicated in FIG. 2 by the dashed-line where it intersects the wing. First and second offset, parallel, planes 113a, 113b (see below) are also indicated in FIG. 2 by the dashed-lines where those planes intersects the wing respectively. Parts of an interfacing cut line 135 extend within those planes, and this is shown by the solid lines in FIG. 2. The outer end of the fixed wing 105 and the inner end of the wing tip device 103 meet along the interfacing cut-line 135 that separates the outer surfaces of the fixed wing 105 and the wing tip device 103. The interfacing cut-line 135 is stepped, and is formed of a series of different lengths, as will now be described:

The interfacing cut line 135 comprises a first length 137 extending from the trailing edge, over the upper-aft quadrant (UA) to the start of a transition section 139. The first length 137 of interfacing cut line lies in a plane 113a that is parallel to the primary cut plane 113, but it is offset in an inboard direction.

The interfacing cut line 135 also comprises a second length 141 extending from the leading edge, over the upper-fore quadrant (UF) to the other end of the transition section 139. This second length 141 of interfacing cut line also lies in a plane 113b that is parallel to the primary cut plane 113, but it is offset in an outboard direction (i.e. in the opposite direction to the other plane 113a).

It will be appreciated from above, that the first and second lengths 137, 141 thus both lie in oblique planes parallel to the primary cut plane 113, but in planes that are offset from that primary cut plane in opposite directions.

Between the first 137 and second lengths 141 is a transition section 139. The transition section 139 comprises a first section 139a that lies in the same plane 113a as the first length 137 and a second section 139b at which the interfacing cut jumps across from the first plane 113a to the second plane 113b. The transition section 139 thus transitions the interfacing cut line 135 from the first 137 to the second 141 lengths.

The arrangement in FIG. 2 has been found to be beneficial, especially in terms of being able to seal the interface between the wing and wing tip device. Nevertheless, embodiments of the present invention are thought to provide a yet further improvement, as will become apparent with reference to FIGS. 3a to 10.

Figure 3A:
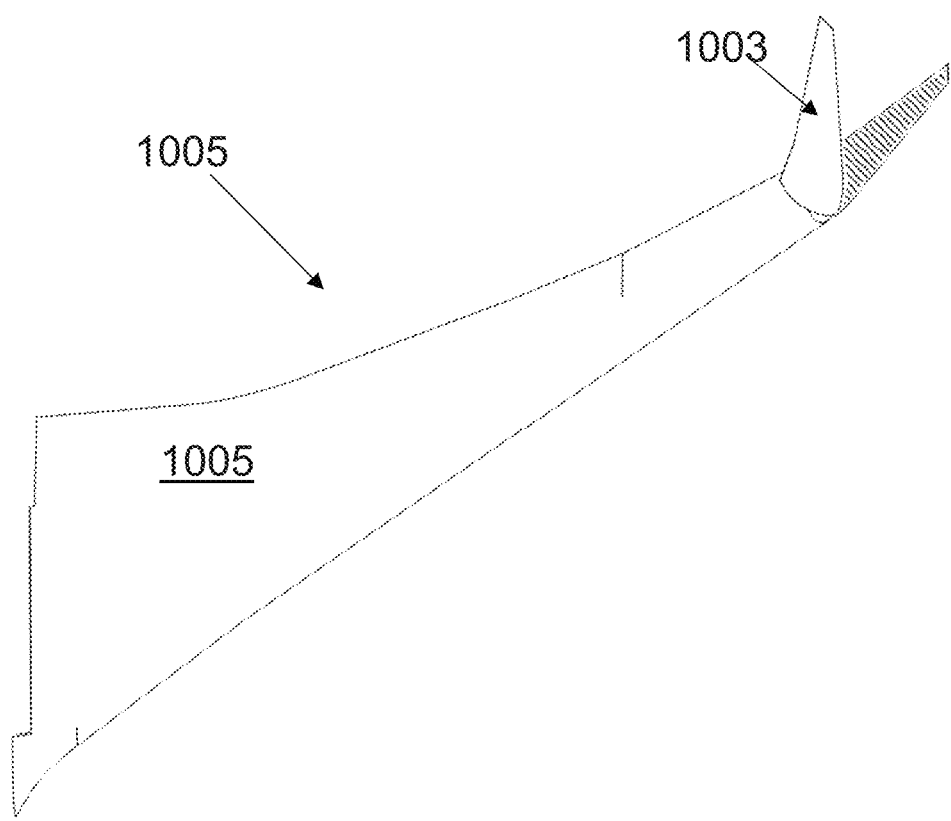
FIG. 3a shows a simplified planform view of a wing on an aircraft of a first embodiment of the invention, the wing being shown with the wing tip device in both the flight and ground configurations.
Figure 3B:
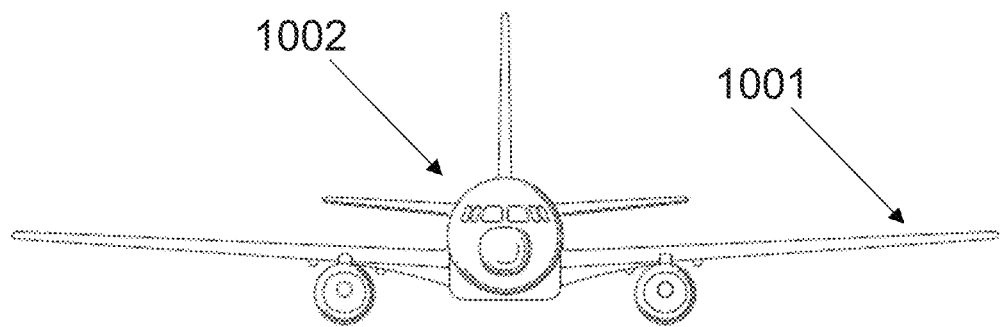

FIG. 3a shows a planform view of a wing 1001 on an aircraft 1002 of a first embodiment of the invention (the aircraft is shown in FIG. 3b). In FIG. 3a, the wing 1001 is shown with the wing tip device 1003 in both the flight and ground configurations. The flight configuration is shown in shaded form, and FIG. 3a self-evidently shows the reduction in span that occurs when the wing tip device 1003 rotates to the ground configuration. For the purposes of FIG. 3a the interfacing cut line between the fixed wing and the wing tip device is shown in simplified form—its actual shape is shown in the subsequent Figures, to which further reference is made below.

The wing tip device 1003 of the first embodiment is, in general terms, rotatable in a similar manner to that shown in FIGS. 1a-1b and in FIG. 2. In other words, the wing tip device 1003 is rotatable about an axis 1011 that is orientated normal to a notional primary oblique cut plane 1013 (see FIG. 4) separating the outer end of the fixed wing 1005 and the inner end of the wing tip device 1003. The axis 1011 is at an acute angle to all three mutually perpendicular axes X, Y and Z (i.e. chordwise, spanwise and vertical). The wing comprises a ring-shaped slew-bearing (not shown) for guiding rotation and reacting loads into the fixed wing. The notional primary cut plane 1013 passes through the middle of this slew-bearing.

Figure 5A:
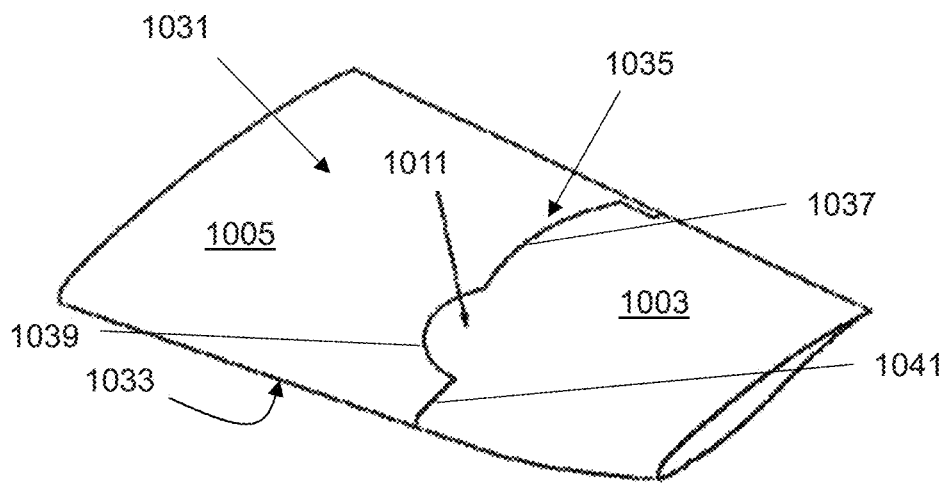
FIG. 5a is another above-frontal view of the wing in the vicinity of the fixed wing/wing tip device interface, showing the interfacing cut-lines and the cut planes.
Figure 6A:
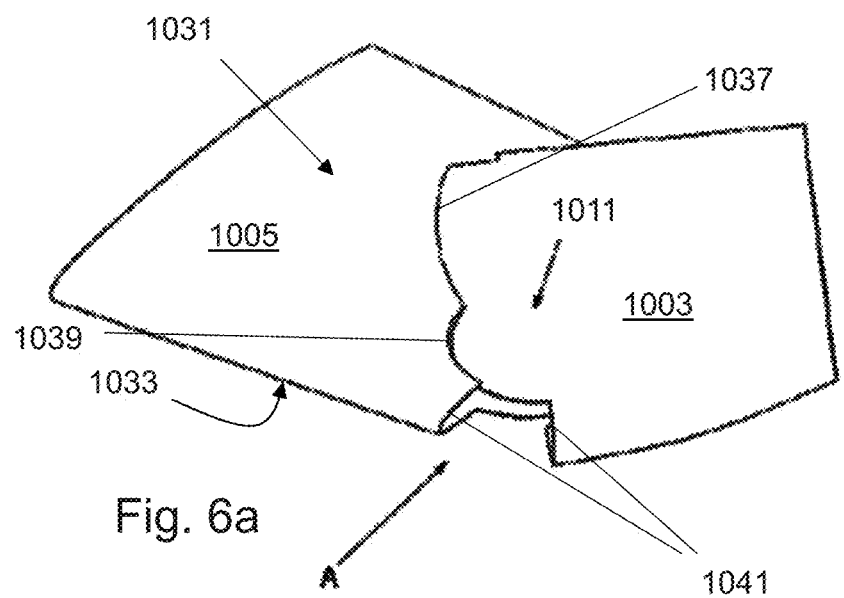
FIGS. 6a and 6b are the same as those in FIGS. 5a and 5b except that the wing tip device is in the ground configuration rather than the flight configuration.
Figure 7:
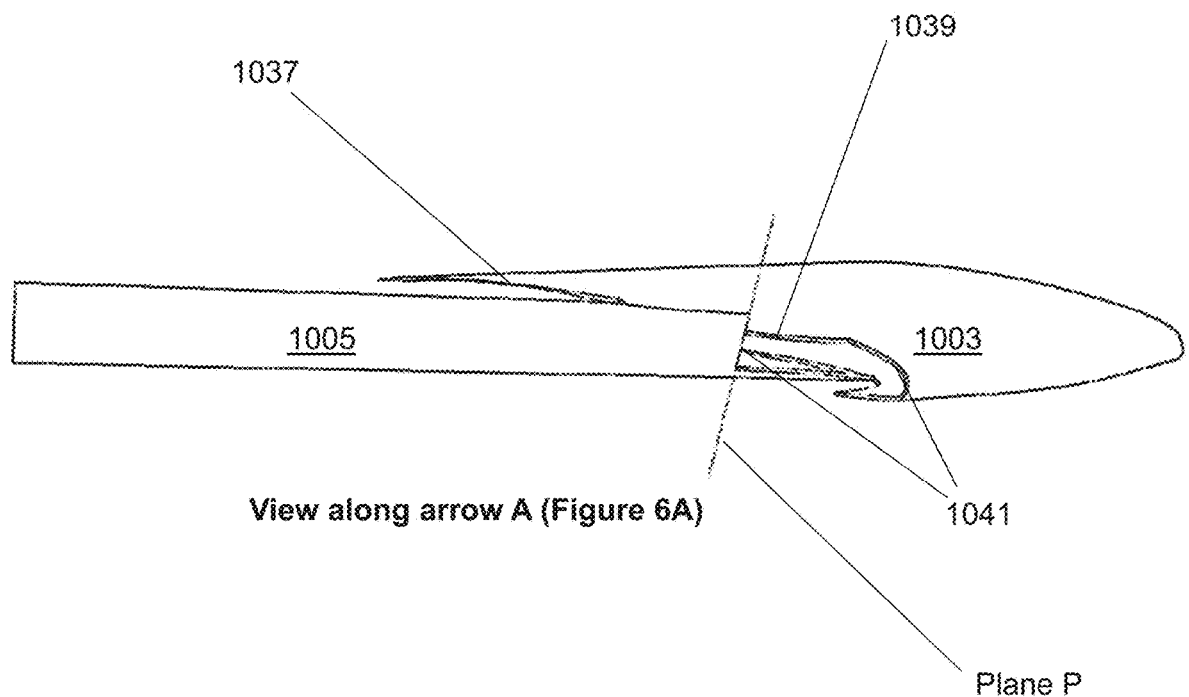

As evident in FIG. 7 and when comparing FIGS. 5*a* and 6*a*, the nature of the movement is such that as the wing tip device 1003 is rotated about the axis 1011, the upper and lower surfaces of the wing tip device that are fore of the axis 1011, move downwards; whereas the upper and lower surface that are aft of the axis move upwards.

Figure 4:
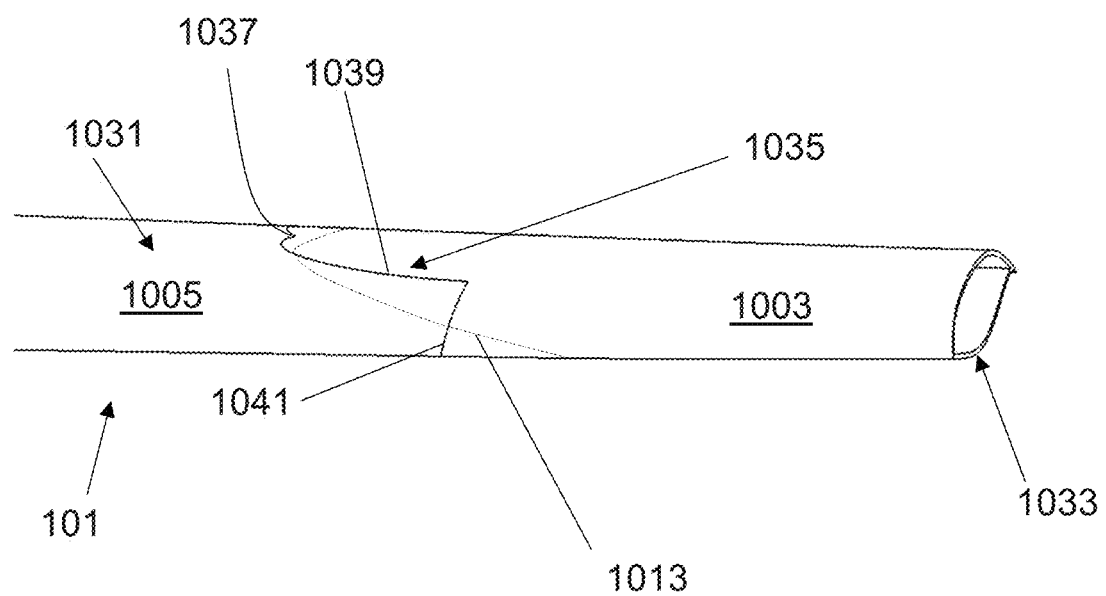
FIG. 4 is an above-frontal view of the wing in the vicinity of the fixed wing/wing tip device interface in the first embodiment of the invention, and is taken from a similar view point to that used in FIG. 2.
Figure 5B:
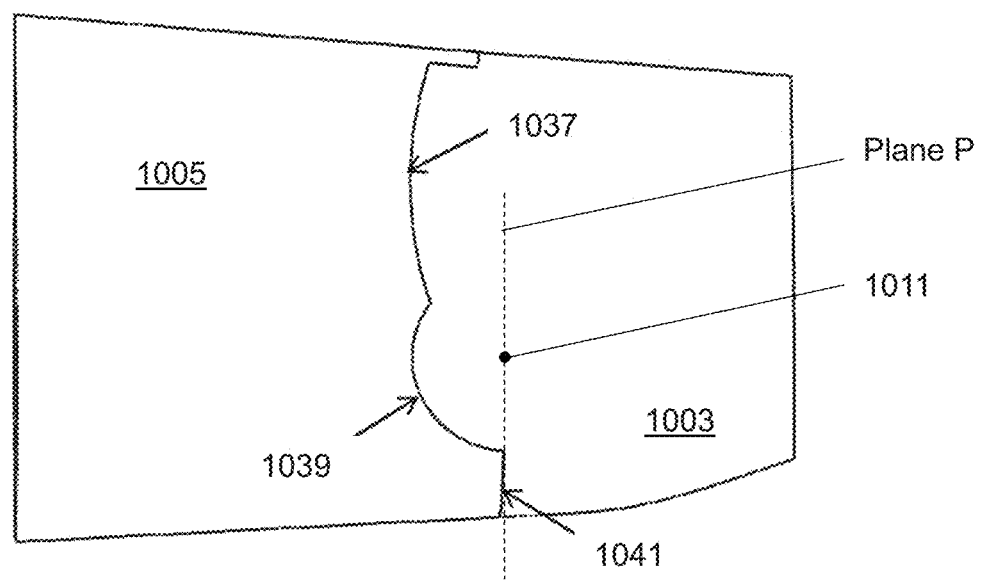

Aspects of the present invention particularly reside in the shape of the interfacing cut line between the fixed wing and the wing tip device and that will now be described in more detail with reference to FIGS. 4 to 10:

Referring first to FIGS. 4, 5*a* and 5*b*, these show views of the region around the fixed wing/wing tip device interface. The wing tip device 1003 is a planar wing tip extension (the distal end of which is not visible in these Figures). In a similar manner to FIG. 2, the wing 1001 has an upper surface 1031 and a lower surface 1033. The outer end of the fixed wing 1005 and the inner end of the wing tip device 1003 meet along the interfacing cut-line 1035 that separates the outer surfaces of the fixed wing 1005 and the wing tip device 1003. The interfacing cut line 1035 is arranged such that when the wing tip device 1003 rotates from the flight configuration to the ground configuration, specific types of relative movement occur between the outer end of the fixed wing 1005 and the inner end of the wing tip device 1003. The interfacing cut-line 1035 is formed of a series of different lengths, which are described in more detail below.

The fixed wing 1005 and the wing tip device 1003 are separated along the notional primary cut plane 1013 (to which the axis of rotation is perpendicular). The primary cut plane 1013 is indicated in FIG. 4 by the dashed-line where it intersects the wing, but does not manifest itself as a physical cut in the wing skin. Instead, and in common with the arrangement in FIG. 2, the interfacing cut line 1035 comprises a first length 1037 in the upper-aft quadrant that is offset from the primary cut plane 1013. However, in contrast to the arrangement in FIG. 2, the first length does not lie in a parallel plane; instead it is curved such that it does not lie within any single plane. Having the first length in such a curved shape has been found to be beneficial in terms of the resulting relative movement between the fixed wing and the wing tip device along the interface (when the wing tip device rotates about the axis). Furthermore, it may facilitate a relatively small transition section between the first length 1037, and a third length 1045 (on the underside of the wing—see FIG. 10), in the region of the trailing edge because the ends of those lengths can be brought relatively close together.

Figure 6B:
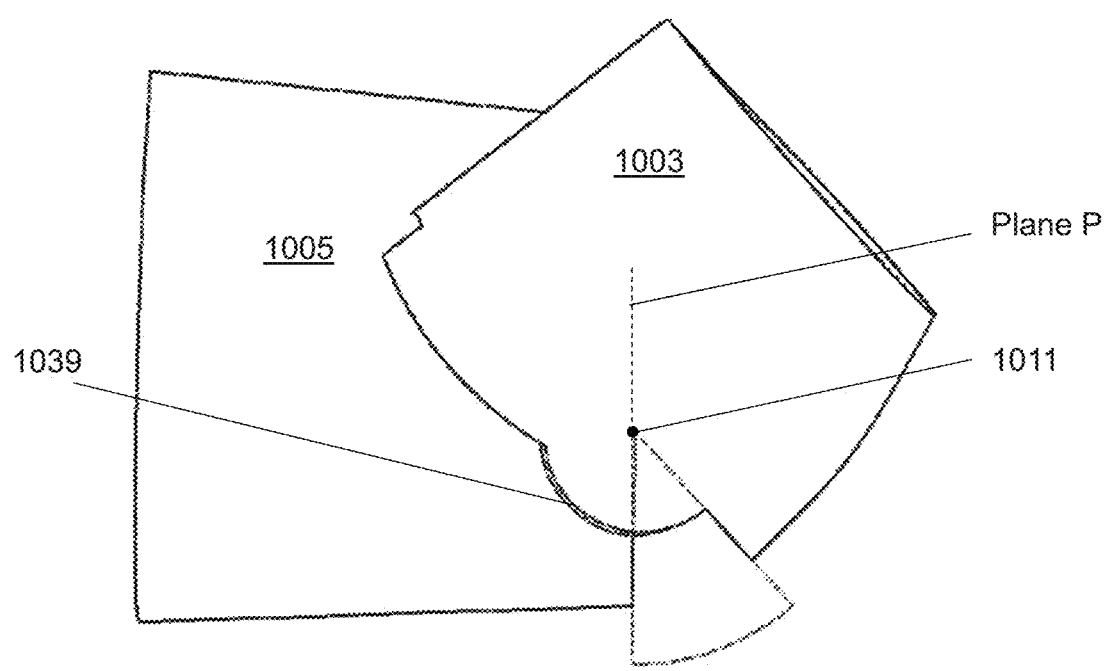

The interfacing cut line 1035 also comprises a second length 1041 located fore of the axis of rotation 1011. In contrast to the arrangement in FIG. 2, the second length is not offset outboard; instead the second length 1041 extends along the upper surface 1031 of the wing, passes through the leading edge and extends onto the lower surface 1031 of the wing. The second length 1041 lies within a plane P (schematically indicated by a dashed line in some of the Figures) containing the axis of rotation 1011, and that plane also being substantially perpendicular to the front spar of the wing (not shown). This is best illustrated in FIGS. 5*b*, 6*b* and 7.

Providing a second length 1041 that is within a plane containing the axis of rotation 1011 has been found to be especially beneficial. It has been recognised that by forming the second length in this manner, the fixed wing 1005 and wing tip device 1003 separate simultaneously along the full length of the second cut line 1041, as the wing tip device 1003 moves from the flight configuration towards the ground configuration. Furthermore, the orientation of the second length 1041 of the interfacing cut line 1035 tends to mean the fixed wing 1005 and the wing tip device 1003 separate (along the second length 1041) in a locally perpendicular direction. Thus the sealing movement tends to be a pure compression.

In other embodiments (not shown) the second length may not necessarily be in a plane containing the axis of rotation—it may instead be in a parallel plane to that. Such an arrangement does not necessarily have the simultaneously separation between the fixed wing and the wing tip device, but it does still tend to exhibit the perpendicular relative movement between the two sides of the interfacing cut line which is beneficial in terms of sealing.

Figure 8:
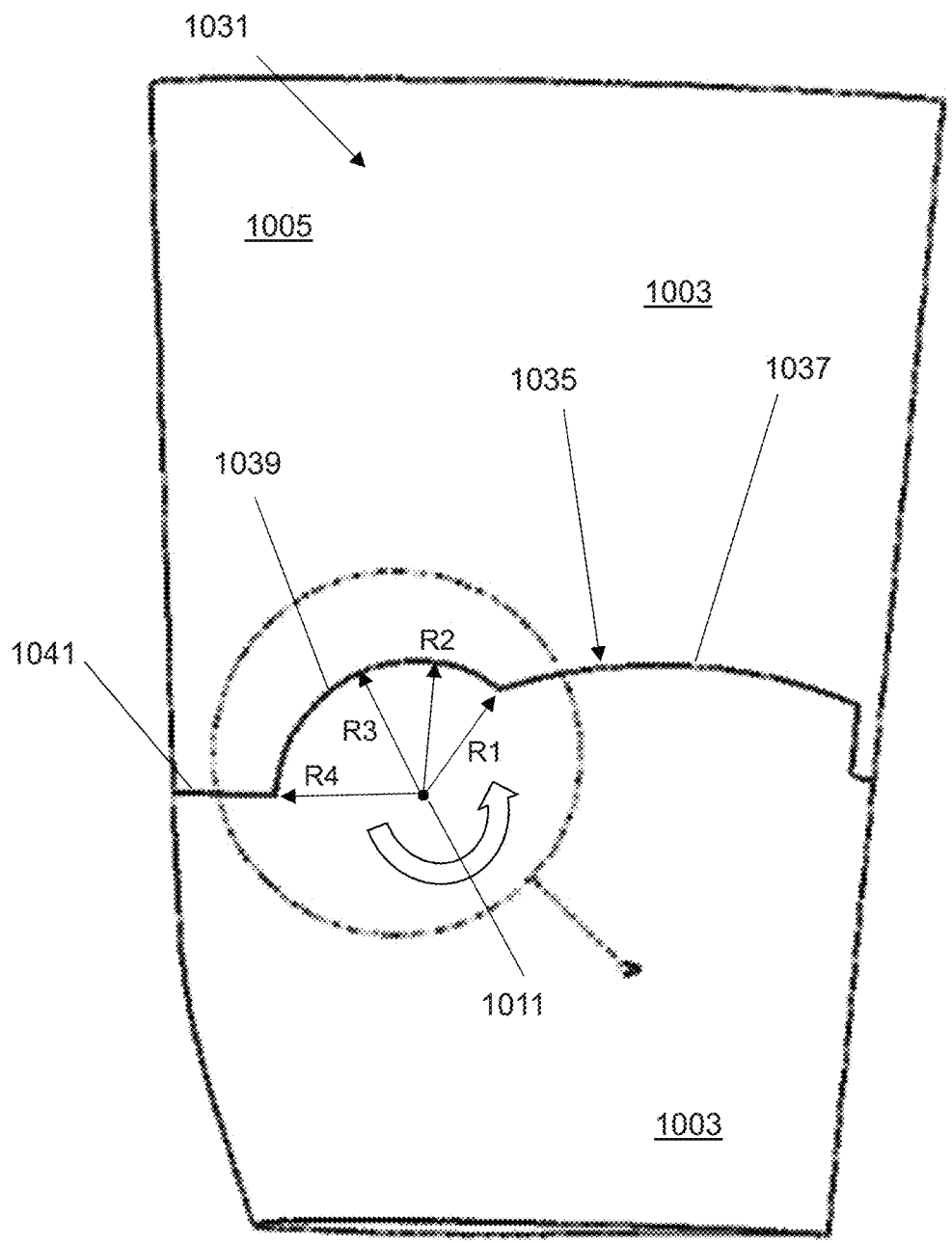
FIG. 8 is another plan view looking in a direction along the axis of rotation of the wing tip device.

A further advantageous feature of the first embodiment of the invention is the shape of the transition section 1039 between the first and second lengths 1037, 1041. In the first embodiment of the invention, the transition section 1039 is substantially in the form of a spiral as will now be explained with reference to FIGS. 8 and 9*a*-9*c*:

FIG. 8 is a view from above the wing along the axis of rotation 1011 of the wing tip device 1003, and towards the upper surface 1031 of the wing on which the interfacing cut line 1035 lies. Overlaid onto FIG. 8 are some radii R1-R4 from the axis 1011 to the interfacing cut line 1035.

The radius of the curved section 1039 continually increases as the cut line 1035 passes around the axis 1011 in the direction of rotation that moves the wing tip device from the flight configuration to the ground configuration (shown by the curved arrow in FIG. 8). Accordingly, when moving from a rearward location adjacent the first length of cut line 1037 to a forward location adjacent the second length 1141 of cut line, the radii behave such that R1<R2<R3<R4.

Figure 9A:
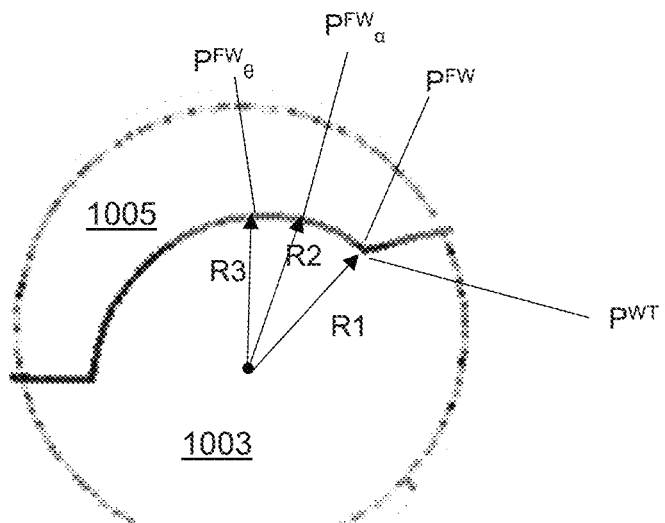
FIGS. 9a-9c show a close up view of the transition region (circled in FIG. 8) as the wing tip device moves from the flight to the ground configurations.
Figure 9B:
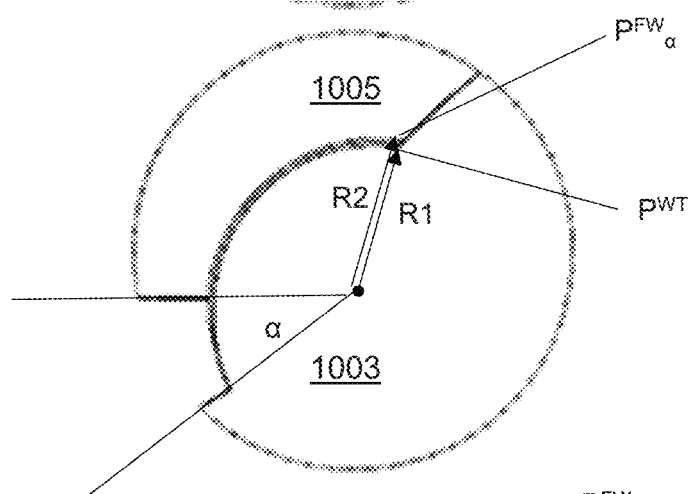
Figure 9C:
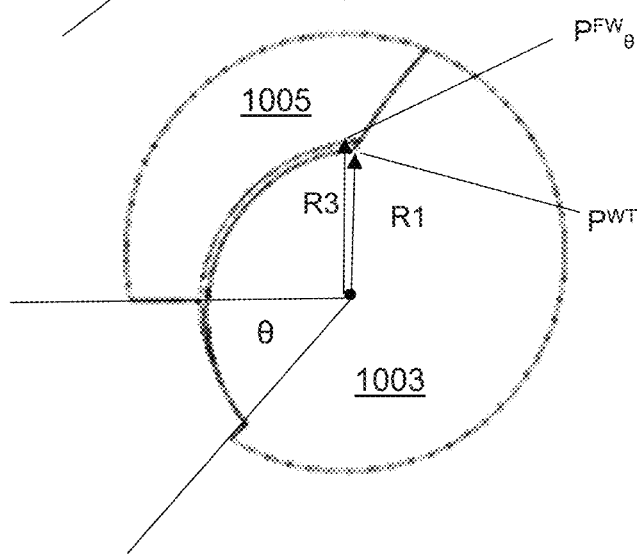

Providing an interfacing cut line having a curved section 1039 in which the radius of the curved section continuously increases around the axis of rotation 1011, has been found to be especially beneficial. In particular, since the radius of the curved section 1039 of the interfacing cut line 1035 increases, and that curved section of the interfacing cut line is centred on the rotational axis 1011 of the wing tip, it means that the structure of the wing tip device 1003 separates away from the structure of the fixed wing 1005 along this part of the interfacing cut line 1039 as the wing tip device 1003 rotates away from the flight configuration. This is best illustrated with reference to FIGS. 9*a* to 9*c*, which are close up views of the area within the dashed circle in FIG. 8 as the wing tip moves from the flight configuration (FIG. 9*a*) to the ground configuration (FIG. 9*c*).

Point $P^{wt}$ along the interfacing cut line 1035, in the curved section 1039, lies on the wing tip device 1003 side, and is at a radius R1 from the axis of rotation. When the wing tip device is in the flight configuration, a corresponding point $P^{fw}$ on the fixed wing 1005 side of the cut line 1039 will be at substantially the same radius (R1) from the axis—see FIG. 9*a*. As the wing tip device 1003 rotates away from the flight configuration by an angle α, the point $P^{wt}$ on the wing tip device 1003 will rotate about the axis—see FIG. 9*b*. That point $P^{wt}$ is still at the radius R1 from the axis 1011 (because it lies on the wing tip device 1003), but since the radius of the cut line 1039 increases as the cut line 1039 passes around the axis, a radially outward point $P^{fw}_\alpha$ on the wing tip device (that is at the same angular location α around the axis as the new position of $P^{wt}$) will be at a greater radius (R2) from the axis due to the behaviour of the curved section 1039. The wing tip device 1003 and fixed wing 1005 will therefore necessarily move apart along the interface 1039 as the wing tip device 1003 moves away from the flight configuration (and vice versa they will move towards each other when moving into the flight configuration). Similar behaviour continues to occur as the wing tip device 1003 rotates further to angle θ—see FIG. 9c. Such movement is beneficial because it tend to avoid relative sliding movement at the interface 1039.

In the first embodiment the curved section 1039 is created by creating a spline through several radii such that curved substantially follows a spiral. In other embodiments (not shown) it will be appreciated that the curve may be an exact spiral or may be other shapes that display an increasing radius around the axis of rotation. In alternative embodiments of the invention, the curve may be a regular arc of a circle. The inclinations of the end faces of the fixed wing and wing tip device are such that rotational movement of the wing tip device results in translational movement of the interfacing surfaces away from each other, without sliding movement taking place.

It will be appreciated that the spiral shape of the curved section 1039 is made with reference to the view from above and along the axis of rotation (i.e. with reference to a projection of the curved section 1039 onto a plane that is perpendicular to the axis of rotation 1011). In reality, the shape of the curved section 1039 is also likely to extend out of this plane because of the curved nature of the outer surface of the wing. Nevertheless, aspects of the present invention recognise that it is the curvature around the axis of rotation of the wing tip device that is especially important in allowing the fixed wing and wingtip device to separate effectively, and it is therefore the behaviour of the curved shape from this view that is especially important.

Figure 10:
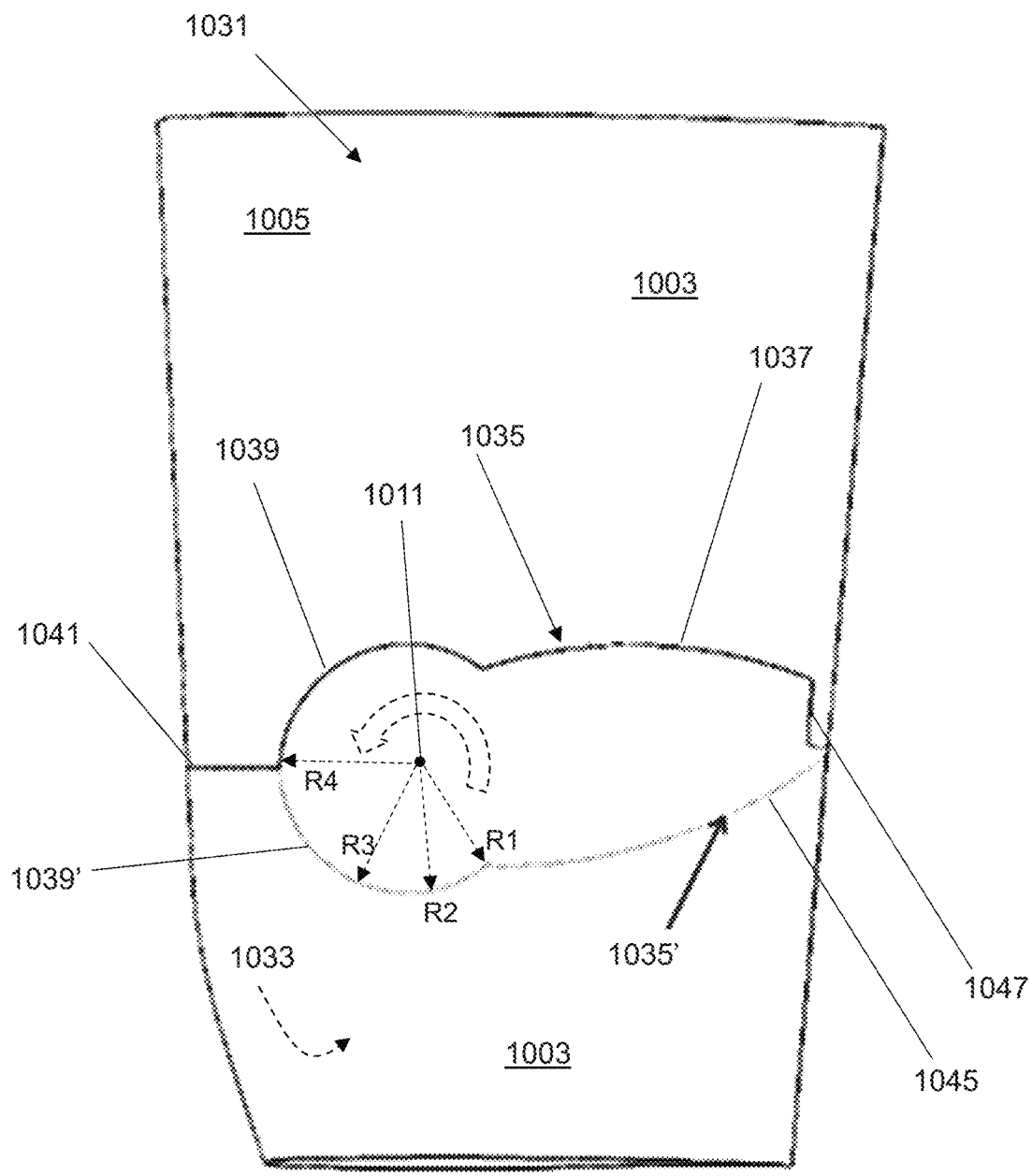
FIG. 10 is another plan view looking in a direction along the axis of rotation of the wing tip device, but also showing the interfacing cut line on the lower surface of the wing.
Figure 11:
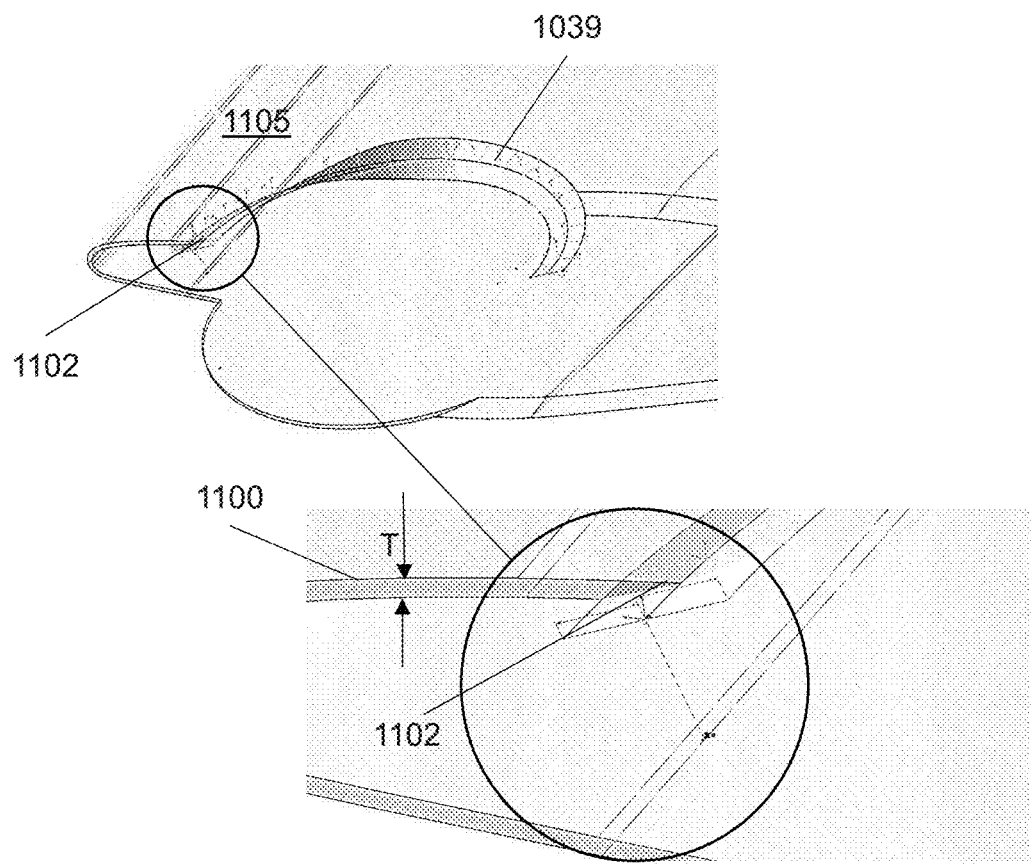
FIG. 11 shows an end view of a fixed wing device, including an exploded section providing more detail regarding the interfacing sections.

Reference to the interfacing cut line in FIGS. 4 to 9c has primarily been in relation to the interfacing cut line 1035 on the upper surface 1031 of the wing. Corresponding features are also present on the lower surface 1033 however, and in that respect reference is now made to FIG. 10. FIG. 10 is a view from above the axis of rotation 1011 but showing the part 1035' of the interfacing cut line 1035 on the lower surface 1033 in phantom.

The lower part 1035' of the interfacing cut line comprises a third length 1045 extending on the lower aft quadrant, and linking with the first length 1037 (on the upper surface aft quadrant) via a transition 1047 at the trailing edge. The third length 1045 is curved such that it minimises the length of the transition section 1047, yet still avoids a clash (for example with the upper surface of the wing) as the wing tip device rotates to the ground configuration.

The interfacing cut line also comprises a second curved, substantially spiral, section 1039' on the lower surface linking the third length 1045 with an end of the second length 1041 on the lower surface 1033. The second curved section 1039' also has a radius that increases as the cut line passes around the axis 1011 from the rearward location at which it joins the third length 1045 to a forward location at which it joins the second length 1041 on the lower surface (shown in dashed lines in FIG. 10, where R1<R2<R3<R4). Accordingly, as the wing tip device rotates away from the flight configuration, fixed wing and the wing tip device move apart along this interfacing cut line 1035' too.

Although radii R1 to R4 have been shown in FIG. 10, it will be appreciated that the radii need not necessarily be of the same magnitude/exact behaviour as those on the upper surface spiral section 1039.

FIGS. 11, and 13 to 15 show the cut line 1039 in greater detail. The outer end of the fixed wing 1005 comprises an upper wing skin 1100 with a thickness T in the region of the cut line 1039. At the cut line 1039, the upper wing skin 1100 comprises a first interfacing surface 1102. The wing tip device 1003 also comprises an upper wing skin 1104 with a thickness T' in the region of the cut line 1039. At the cut line 1039, the upper wing skin 1104 of the wing tip device 1003 comprises a second interfacing surface 1106. When the wing tip device 1003 is in the flight configuration, the first interfacing surface 1102 and the second interfacing surface 1106 are brought into close proximity and/or direct or indirect contact with each other, such that a compressive sealing force is exerted between the first interfacing surface 1102 and the second interfacing surface 1106. One or both of the first interfacing surface 1102 and second interfacing surface 1106 may include a compressible seal to further increase the sealing effect when the wing tip device 1003 is in the flight configuration. In order to provide a good sealing effect between the first interfacing surface 1102 and second interfacing surface 1106, each surface is inclined in the same plane at the point of contact when the wing tip device 1103 is in the flight configuration. As the interfacing cut line 1039 (and hence the first interfacing surface 1102 and second interfacing surface 1106) traces a curve from in front of the rotational axis 1011 to behind the rotational axis 1011, the plane in which the first interfacing surface 1102 and second interfacing surface 1106 are located also twists, such that fore of the rotational axis 1011 the end surface defined by the first interfacing surface points downwards and the end surface defined by the second interfacing surface points upwards, the aft of the rotational axis 1011 the end surface defined by the first interfacing surface 1102 points upwards and the end surface defined by the second interfacing surface 1106 points downwards. This change of orientation can be seen in further detail in FIG. 12. The upwards and downwards directions are determined relative to the Z axis of the aircraft when the aircraft is on the ground, and for the end surface to be pointing downwards does not require that the end surface to be pointing entirely downwards, and vice versa for upwards. Alternatively, the upwards and downwards direction may be defined local to the orientation of the wing.

As previously stated, when looking at FIG. 7 and when comparing FIGS. 5a and 6a, the nature of the movement is such that as the wing tip device 1003 is rotated about the axis 1011, the upper and lower surfaces of the wing tip device that are fore of the axis 1011, move downwards; whereas the upper and lower surface that are aft of the axis move upwards. By providing a first interfacing surface 1102 and second interfacing surface 1106 with a twist as described, as the wing tip device 1003 is moved away from the flight configuration, as well as rotational movement, the first interfacing surface 1102 and second interfacing surface 1106 initially move perpendicularly away from each other. This prevents binding or friction as the wing tip device 1003 is rotated, improving the ease of movement and reducing wear. Also, as the wing tip device 1003 is moved back into the flight configuration, the first interfacing surface 1102 and second interfacing surface 1106 move towards each other, such that the two surfaces meet with compressive force between them, thereby improving the seal between the two surfaces when the wing tip device 1003 is in the flight configuration.

In the present invention, the wing tip device is moved such that the distal end of the wing tip device is swept upwards and backwards as the wing tip device moves into the ground configuration. The skilled person will realise that these movements can be changed, such that the distal end of the wing tip device may be swept forwards and/downwards when moving into the ground configuration, and the orientations of the first interfacing surface and second interfacing surface may be changed accordingly. However, there would still be a twist of the surfaces along the interfacing cut line, such that the orientations of the first interfacing surface and second interfacing surface, relative to the rotational axis of the wing tip device, changes along the interfacing cut line. The orientations of the first interfacing surface and second interfacing surface would be reliant on the local movement of those surfaces relative to each other as the wing tip device moves between the flight configuration and ground configuration.

Figure 12:
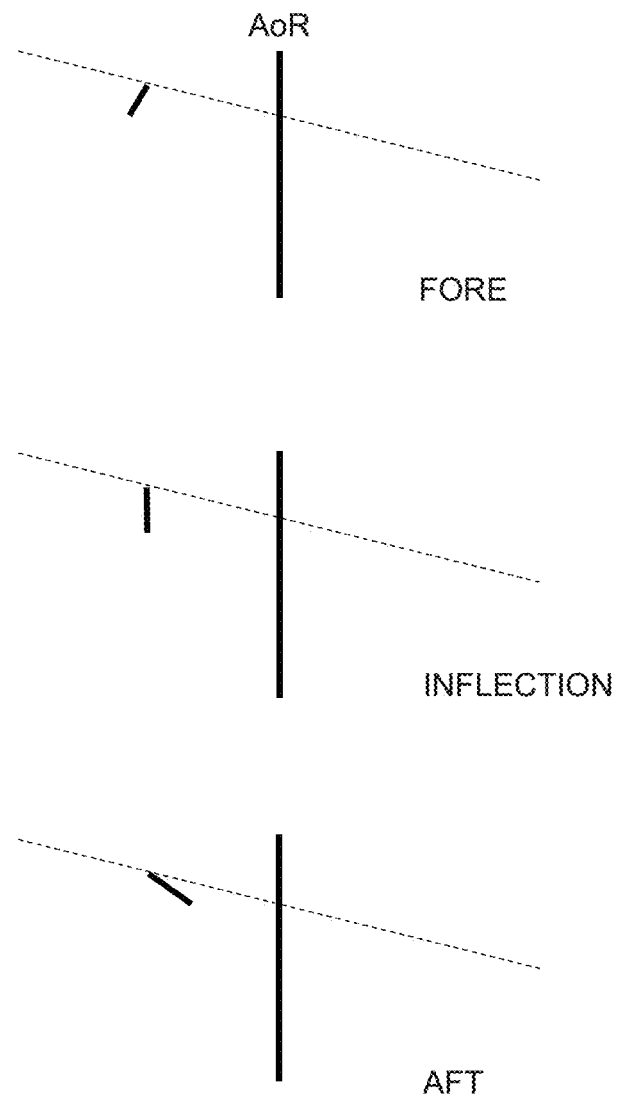
FIG. 12 illustrates the change of orientation of the wing tip device from the fore to aft of the axis of rotation.
Figure 13:
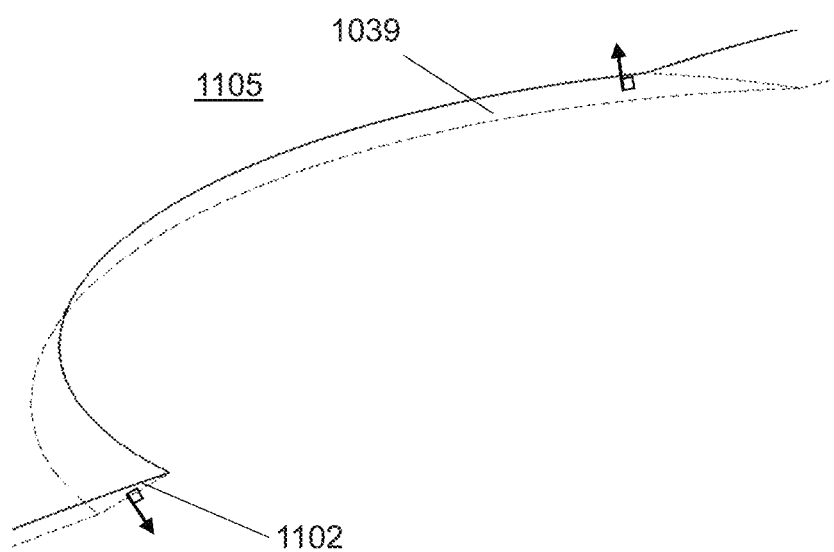
FIG. 13 shows an isolated view of the interfacing surface of the upper skin of the fixed wing device shown in FIG. 11.
Figure 14:
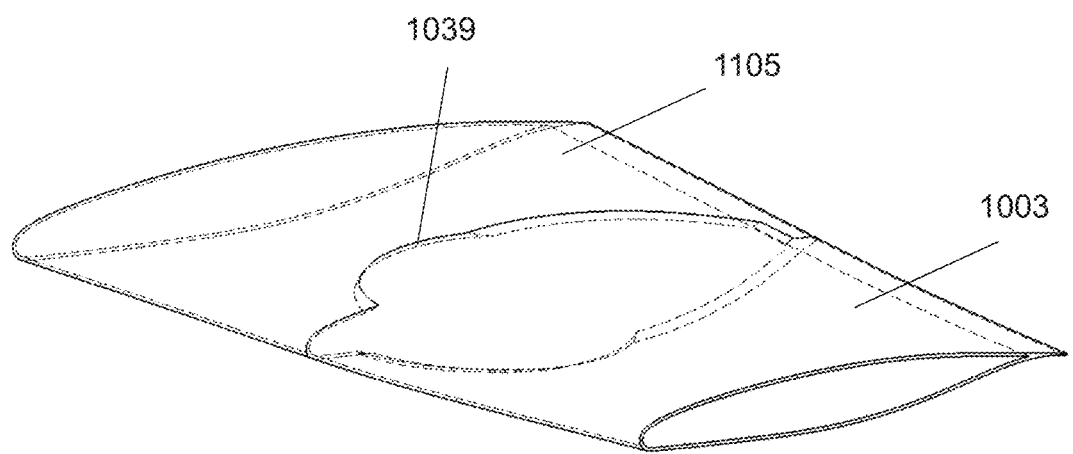
FIG. 14 shows a side view of a fixed wing as shown in FIG. 11 and wing tip device according to the invention, the wing tip device in the ground configuration.
Figure 15:
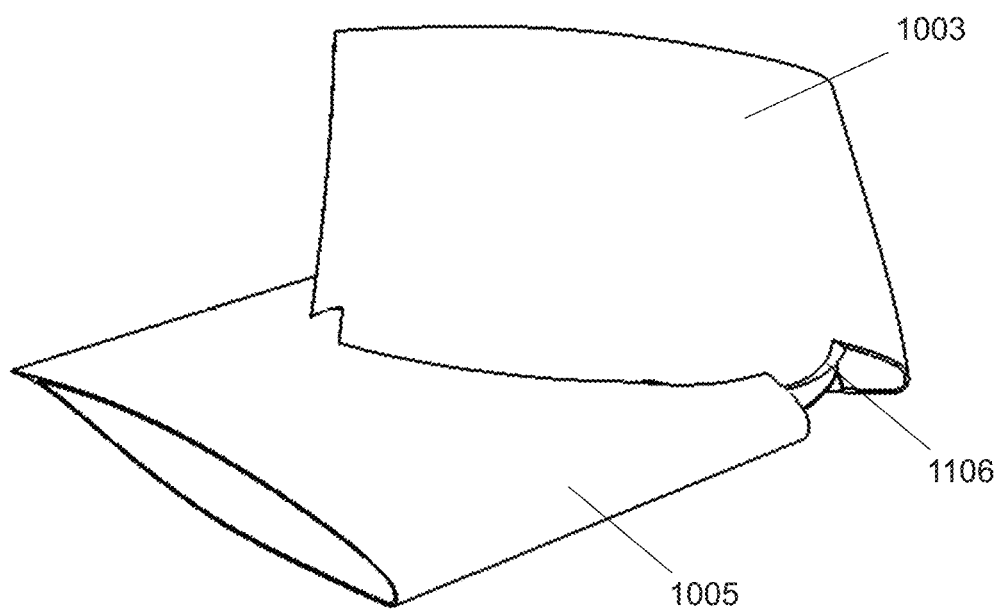
FIG. 15 shows the arrangement of FIG. 14 with the wing tip device in the ground configuration.
Figure 16:
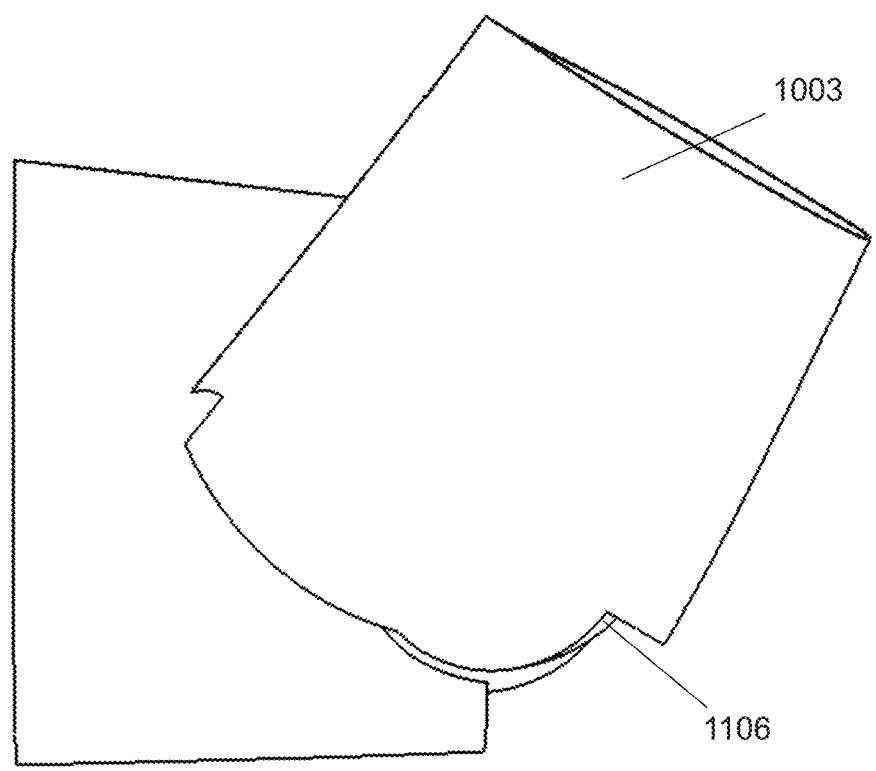
FIG. 16 shows the arrangement of FIG. 15 from a plan perspective.

FIG. 12 shows how the orientation of the interfacing surfaces twists from a first inclination fore of the axis of rotation (AoR), to a second, opposite inclination aft of the axis of rotation, where a continuous twisting of the angle of orientation provides a point of inflection which is parallel to the axis of rotation. The dashed line shows the top surface of the upper wing skin. Whilst the description above has related mostly to the interfacing cut line in the upper wing skin, the skilled person will appreciate that a corresponding configuration may be, and is preferably, present in the lower wing skin of the aircraft. Such an arrangement allows the easy separate of the lower wing skin when moving from the flight configuration to the ground configuration, and also an improved sealing arrangement when moving from the ground configuration to the flight configuration.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a wing, the wing having a fixed wing with a wing tip device moveably mounted at the outer end of the fixed wing, the wing tip device is moveable between:
   (a) a flight configuration for use during flight; and
   (b) a ground configuration for use during ground-based operations, in which ground configuration the wing tip device is moved away from the flight configuration such that a span of the aircraft wing is reduced,
   wherein the wing tip device and the fixed wing are separated along a primary cut plane, the primary cut plane is obliquely orientated, and the wing tip device is rotatable between the flight and ground configurations, about an axis of rotation orientated normal to the primary cut plane,
   and wherein
   when the wing tip device is in the flight configuration, an outer end of the fixed wing and an inner end of the wing tip device meet along an interfacing cut line that separates the outer surfaces of the fixed wing and the wing tip device,
   the interfacing cut line comprising:
   a curved section curving around the axis of rotation, the curved section extending both fore and aft of the axis of rotation; and wherein
   the outer end of the fixed wing comprises a first interfacing surface corresponding with the curved section of the interfacing cut line,
   the inner end of the wing tip device comprises a second interfacing surface corresponding with the curved section of the interfacing cut line,
   and wherein when the wing tip device is in the flight configuration: at a location fore of the axis of rotation, the first interfacing surface and second interfacing surface are at a first inclination to the axis of rotation, and the first interfacing surface and second interfacing surface twist as the first and second interfacing surfaces pass along the length of the curved section such that at a location aft of the axis of rotation, the first interfacing surface and second interfacing surface are orientated at a second, opposite inclination to the axis of rotation.

2. The aircraft according to claim 1, wherein the transition of the first interfacing surface and second interfacing surface from the first inclination to the second, opposite, inclination, is continuous.

3. The aircraft according to claim 1, wherein the fixed wing comprises an upper wing skin, and the first interfacing surface is an end face of the upper wing skin facing in a downwards direction to the fore of the axis of rotation and an upwards direction to the aft of the axis of rotation.

4. The aircraft according to claim 1, wherein the wing tip device comprises an upper wing tip skin, and the second interfacing surface is an end face of the upper wing tip skin facing in an upwards direction to the fore of the axis of rotation and a downwards direction to the aft of the axis of rotation.

5. The aircraft according to claim 1, wherein the fixed wing comprises a lower wing skin, and the first interfacing surface is an end face of the lower wing skin facing in a downwards direction to the fore of the axis of rotation and a upwards direction to the aft of the axis of rotation.

6. The aircraft according to claim 1, wherein the wing tip device comprises a lower wing tip skin, and the second interfacing surface is an end face of the lower wing tip skin facing in an upwards direction to the fore of the axis of rotation and a downwards direction to the aft of the axis of rotation.

7. The aircraft according to claim 1, wherein the radius of the curved section constantly increases as the cut line passes around the axis.

8. The aircraft according to claim 1, wherein the wing comprises a sealing assembly for sealing between the fixed wing and the wing tip device when the wing tip device is in the flight configuration, and wherein the sealing assembly comprises a compression seal for making/breaking a seal under a relative coming together/separation of the fixed wing and wing tip device, the compression seal associated with curved section.

9. The aircraft according to claim 1, wherein the interfacing cut line comprises
   (i) a first length, formed by a cut through the outer surface, that is offset from the primary cut plane in a first direction;
   (ii) a second length, formed by a cut through the outer surface that extends within a plane containing the axis of rotation, or within a plane parallel to the axis of rotation; and
   (iii) wherein the curved section centred on the axis of rotation is a transition section over which the interfacing cut line transitions from the first length to the second length.

10. An aircraft according to claim 9, wherein the second length is formed by a cut through the outer surface that extends within the plane containing the axis of rotation.

11. The aircraft according to claim 9, wherein the plane within which the second length extends, is orientated in the line-of-flight direction.

12. The aircraft according to claim 9, wherein the fixed wing comprises a front spar and the plane within which the second length extends, is orientated perpendicular to the front spar.

13. The aircraft according to claim 9, wherein the first length is located aft of the axis of rotation, and second length is located fore of the axis of rotation.

14. An aircraft wing, the aircraft wing having a fixed wing with a wing tip device moveably mounted at the outer end of the fixed swing, the wing tip device is moveable between:
   (a) a flight configuration for use during flight; and
   (b) a ground configuration for use during ground-based operations, in which ground configuration the wing tip device is moved away from the flight configuration such that the span of the aircraft wing is reduced,
   wherein the wing tip device and the fixed wing are separated along a primary cut plane, the primary cut plane is obliquely orientated, and the wing tip device is rotatable between the flight and ground configurations, about an axis of rotation orientated normal to the primary cut plane,
   and wherein
   when the wing tip device is in the flight configuration, an outer end of the fixed wing and an inner end of the wing tip device meet along an interfacing cut line that separates the outer surfaces of the fixed wing and the wing tip device,
   the interfacing cut line comprising:
   a curved section curving around the axis of rotation, the curved section extending in a chordwise direction both fore and aft of the axis of rotation; and wherein
   the outer end of the fixed wing comprises a first interfacing surface corresponding with the curved section of the interfacing cut line,
   the inner end of the wing tip device comprises a second interfacing surface corresponding with the curved section of the interfacing cut line,
   and wherein when the wing tip device is in the flight configuration:
   at a location fore of the axis of rotation, the first interfacing surface and second interfacing surface are at a first inclination to the axis of rotation, and the first interfacing surface and second interfacing surface twist as the first and second interfacing surfaces pass along the length of the curved section such that at a location aft of the axis of rotation, the first interfacing surface and second interfacing surface are orientated at a second, opposite inclination to the axis of rotation.

15. A fixed wing for an aircraft, the fixed wing configured to receive a wing tip, the wing tip device is moveable between:
   (a) a flight configuration for use during flight; and
   (b) a ground configuration for use during ground-based operations, in which ground configuration the wing tip device is moved away from the flight configuration such that the span of the aircraft wing is reduced,
   wherein the wing tip device and the fixed wing are separated along a primary cut plane, the primary cut plane is obliquely orientated, and the wing tip device is rotatable between the flight and ground configurations, about an axis of rotation orientated normal to the primary cut plane,
   and wherein
   when the wing tip device is in the flight configuration, an outer end of the fixed wing and an inner end of the wing tip device meet along an interfacing cut line that separates the outer surfaces of the fixed wing and the wing tip device,
   the interfacing cut line comprising:
   a curved section curving around the axis of rotation, the curved section extending in a chordwise direction both fore and aft of the axis of rotation; and wherein
   the outer end of the fixed wing comprises a first interfacing surface corresponding with the curved section of the interfacing cut line,
   wherein at a location fore of the axis of rotation, the first interfacing surface is at a first inclination to the axis of rotation, and the first interfacing surface twists as the first interfacing surface passes along the length of the curved section such that at a location aft of the axis of rotation, the first interfacing surface is orientated at a second, opposite inclination to the axis of rotation.

16. A wing tip device for an aircraft, the wing tip device is received on a fixed wing, the wing tip device is moveable between:
   (a) a flight configuration for use during flight; and
   (b) a ground configuration for use during ground-based operations, in which ground configuration the wing tip device is moved away from the flight configuration such that the span of the aircraft wing is reduced,
   wherein the wing tip device and the fixed wing are separated along a primary cut plane, the primary cut plane is obliquely orientated, and the wing tip device is rotatable between the flight and ground configurations, about an axis of rotation orientated normal to the primary cut plane,
   and wherein
   when the wing tip device is in the flight configuration, an outer end of the fixed wing and an inner end of the wing tip device meet along an interfacing cut line that separates the outer surfaces of the fixed wing and the wing tip device,
   the interfacing cut line comprising:
   a curved section curving around the axis of rotation, the curved section extending both fore and aft of the axis of rotation; and wherein
   the inner end of the wing tip device comprises a second interfacing surface corresponding with the curved section of the interfacing cut line,
   and wherein when the wing tip device is in the flight configuration: at a location fore of the axis of rotation, the second interfacing surface are at a first inclination to the axis of rotation, and the second interfacing surface twists as the second interfacing surface passes along the length of the curved section such that at a location aft of the axis of rotation, the second interfacing surface is orientated at a second, opposite inclination to the axis of rotation.

17. An aircraft comprising a wing, the wing having a fixed wing with a wing tip device moveably mounted at the outer end of the fixed wing, the wing tip device is moveable about an axis of rotation between:
   (a) a flight configuration for use during flight; and
   (b) a ground configuration for use during ground-based operations, in which ground configuration the wing tip device is moved away from the flight configuration such that the span of the aircraft wing is reduced,
   and wherein
   when the wing tip device is in the flight configuration, an outer end of the fixed wing and an inner end of the wing tip device meet along a curved interfacing cut line that separates the outer surfaces of the fixed wing and the wing tip device along the curved interfacing cut line, and the outer end of the fixed wing comprises a first interfacing surface corresponding with the interfacing cut line,
   the inner end of the wing tip device comprises a second interfacing surface corresponding with the interfacing cut line,
   and wherein when the wing tip device is in the flight configuration: at a location fore of the axis of rotation, the first interfacing surface and second interfacing surface along the curve of the interfacing cut line are at a first inclination to the axis of rotation, and the first interfacing surface and second interfacing surface twist as first and second interfacing surfaces pass along the curve of the interfacing cut line such that at a location aft of the axis of rotation, the first interfacing surface and second interfacing surface are orientated at a second, opposite inclination to the axis of rotation.

* * * * *